(12) United States Patent (10) Patent No.: US 12,634,674 B2
Qiu (45) Date of Patent: May 19, 2026

(54) METHOD FOR DISCOVERING AND CONNECTING TO ELECTRONIC DEVICE AND ELECTRONIC DEVICE

(71) Applicant: Huawei Technologies Co., Ltd., Shenzhen (CN)

(72) Inventor: Zeling Qiu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 304 days.

(21) Appl. No.: 18/474,719

(22) Filed: Sep. 26, 2023

(65) Prior Publication Data

US 2024/0022892 A1 Jan. 18, 2024

Related U.S. Application Data

(63) Continuation of application No. PCT/CN2022/083364, filed on Mar. 28, 2022.

(30) Foreign Application Priority Data

| Mar. 31, 2021 | (CN) | .......................... | 202110351238.9 |
| Jul. 20, 2021 | (CN) | .......................... | 202110821297.8 |

(51) Int. Cl.
 *H04W 8/00* (2009.01)
 *H04W 4/80* (2018.01)
(52) U.S. Cl.
 CPC .............. *H04W 8/005* (2013.01); *H04W 4/80* (2018.02)
(58) Field of Classification Search
 CPC ...................................................... H04W 8/005
 See application file for complete search history.

(56) References Cited

U.S. PATENT DOCUMENTS

| 2013/0322416 | A1 | 12/2013 | Son |
| 2014/0323048 | A1 | 10/2014 | Kang |
| 2014/0342670 | A1* | 11/2014 | Kang ...................... H04L 69/14 |
| | | | 455/67.11 |
| 2015/0206190 | A1 | 7/2015 | Lee et al. |
| 2015/0351146 | A1 | 12/2015 | Lee et al. |
| 2016/0192419 | A1 | 6/2016 | Lee et al. |
| 2016/0360066 | A1 | 12/2016 | Park et al. |
| 2017/0195374 | A1 | 7/2017 | Vu et al. |
| 2017/0374098 | A1 | 12/2017 | Kish et al. |
| 2019/0150215 | A1 | 5/2019 | Li et al. |
| 2020/0092926 | A1 | 3/2020 | Li et al. |
| 2022/0407932 | A1* | 12/2022 | Lee ..................... H02J 7/00045 |

FOREIGN PATENT DOCUMENTS

| CN | 108693969 A | 10/2018 |
| CN | 112654074 A | 4/2021 |
| WO | 2018113086 A1 | 6/2018 |

* cited by examiner

*Primary Examiner* — Natasha W Cosme
(74) *Attorney, Agent, or Firm* — Conley Rose, P.C.

(57) ABSTRACT

A method for discovering and connecting to an electronic device includes a first electronic device broadcasting a packet in a first time period by using a first communication technology; broadcasting a packet in a second time period by using a second communication technology, where the first time period overlaps with the second time period; receiving response information from a second electronic device; and establishing a communication connection to the second electronic device based on a communication technology capability supported by the second electronic device.

20 Claims, 15 Drawing Sheets

Method 300

Method 400

METHOD FOR DISCOVERING AND CONNECTING TO ELECTRONIC DEVICE AND ELECTRONIC DEVICE

CROSS-REFERENCE TO RELATED APPLICATIONS

This is a continuation of International Patent Application No. PCT/CN2022/083364 filed on Mar. 28, 2022, which claims priority to Chinese Patent Application No. 202110351238.9 filed on Mar. 31, 2021 and Chinese Patent Application No. 202110821297.8 filed on Jul. 20, 2021. All of the aforementioned patent applications are hereby incorporated by reference in their entireties.

TECHNICAL FIELD

This application relates to the communication field, and more specifically, to a method for discovering and connecting to an electronic device and an electronic device.

BACKGROUND

In a wireless communication network, a plurality of wireless technology and wired technology solutions are used, such as a BLUETOOTH (BT) technology, a Wi-Fi® technology, a near-field communication (NFC) technology, a ZIGBEE technology, a Universal Serial Bus (USB) technology, and a cellular communication technology. When a device has capabilities of a plurality of wireless technologies and wired technologies, one of the technologies is used to discover another device based on a transmitted service type and a capability difference (for example, a transmission distance, a bandwidth, and the like) between different wireless technologies and wired technologies, and establish a communication connection and data transmission with the other device. However, the method cannot meet a requirement of a business service on the device having the capabilities of the plurality of wireless technology in a heterogeneous network architecture, and user experience is poor.

SUMMARY

This application provides a method for discovering and connecting to an electronic device and an electronic device. Technologies (or capabilities) of all discover devices of one electronic device or a plurality of technologies of all discover devices are used to simultaneously discover another device, to meet a requirement of a business service on discover and connection capabilities of the device having a plurality of different technical capabilities in a heterogeneous network, and improve user experience.

According to a first aspect, a method for discovering and connecting to an electronic device is provided. The method includes a first electronic device broadcasts a first packet in a first time period by using a first communication technology, where the first packet is used to query a communication technology capability of another device; the first electronic device broadcasts a second packet in a second time period by using a second communication technology, where the second packet is used to query a communication technology capability of another device, and the first time period overlaps with the second time period; the first electronic device receives response information sent by a second electronic device (one or more pieces of response information); the first electronic device determines, based on the response information, a communication technology capability supported by the second electronic device; and the first electronic device establishes a communication connection to the second electronic device based on the communication technology capability supported by the second electronic device.

According to the method for discovering and connecting to an electronic device provided in the first aspect, the first electronic device separately broadcasts a packet in an overlapping time period by using a plurality of communication technologies. In other words, time periods in which the first electronic device separately broadcasts a packet by using a plurality of different communication technologies overlap (partially or completely overlap) in time domain. In other words, technologies of all discover devices of a same electronic device or a plurality of technologies of all discover devices are used to simultaneously send (simultaneously broadcast) packets, to meet a requirement of a business service on discover and connection capabilities of the device having a plurality of different technical capabilities in a heterogeneous network, so that more devices supporting a distribution capability may be actively discovered. This implements convergence of a plurality of discover and connection technologies, improves efficiency of discovering and connecting to the electronic device, and improves user experience.

In a possible implementation of the first aspect, the method further includes the first electronic device broadcasts a third packet in a third time period by using a third communication technology, where the third packet is used to query a communication technology capability of another device; and the third communication technology conflicts with the first communication technology, the first time period does not overlap with the third time period in time domain, and the second time period overlaps with the third time period. In this implementation, when the first electronic device simultaneously and separately broadcasts packets by using mutually conflicting (for example, a conflict exists on a channel, an air interface time sequence, or the like) communication technologies, time periods in which the first electronic device separately broadcasts packets by using the mutually conflicting communication technologies do not overlap in time domain, but time periods in which the first electronic device separately broadcasts packets by using a plurality of non-conflicting communication technologies overlap in time domain (partially or completely overlap). In this way, technologies of all discover devices of a same electronic device or a plurality of technologies of all discover devices are used to simultaneously send (simultaneously broadcast) packets, to meet a requirement of a business service on discover and connection capabilities of the device having a plurality of different technical capabilities in a heterogeneous network, and improve user experience.

For example, in embodiments of this application, "simultaneously sending" may be understood as: broadcasting the first packet in the first time period by using the first communication technology, and broadcasting the first packet in the second time period by using the second communication technology. If the first communication technology does not conflict with the second communication technology (for example, a conflict does not exist on a channel, an air interface time sequence, or the like), the first time period and the second time period may overlap (which may be partially or completely overlapping) in time domain. Based on this, the third packet is broadcast in the third time period by using the third communication technology. If the third communication technology conflicts with the first communication technology or the second communication technology (for example, a conflict exists on a channel, an air interface time sequence, or the like), the third time period does not overlap with the first time period in time domain, or the third time period does not overlap with the second time period in time domain. In other words, "simultaneously sending" may be understood as: Time periods in which packets are separately sent by using a plurality of non-conflicting communication technologies overlap (partially or completely overlap) in time domain, and time periods in which packets are separately sent by using mutually conflicting communication technologies do not overlap in time domain.

According to a second aspect, a method for discovering and connecting to an electronic device is provided. The method includes a first electronic device broadcasts a first packet in a first time window by using a first communication technology, where the first packet is used to query a communication technology capability of another device; the first electronic device broadcasts a second packet in the first time window by using a second communication technology, where the second packet is used to query a communication technology capability of another device; the first electronic device receives response information sent by a second electronic device; the first electronic device determines, based on the response information (one or more pieces of response information), a communication technology capability supported by the second electronic device; and the first electronic device establishes a communication connection to the second electronic device based on the communication technology capability supported by the second electronic device.

According to the method for discovering and connecting to an electronic device provided in the second aspect, the first electronic device simultaneously sends a packet by using a plurality of different communication technologies in a time granularity of a same time window by using the plurality of communication technologies. Technologies of all discover devices of a same electronic device or a plurality of technologies or all discover devices are used to simultaneously send (simultaneously broadcast) packets, to meet a requirement of a business service on discover and connection capabilities of the device having a plurality of different technical capabilities in a heterogeneous network, so that more devices supporting a distribution capability may be actively discovered. This implements convergence of a plurality of discover and connection technologies, improves efficiency of discovering and connecting to the electronic device, and improves user experience.

For example, the first time window may be understood as: one shortest time unit that is defined in a wireless communication protocol and that is used to jointly send a group of packets by using a plurality of different communication technologies (for example, BT, Wi-Fi, NFC, Zigbee, USB, cellular, and the like). The time unit is jointly complied with when a packet is sent by using the BT, Wi-Fi, NFC, Zigbee, USB, cellular, and the like. In other words, in the first time window, the first electronic device sends (broadcasts) a packet by using technologies of all discover devices or a plurality of technologies of all discover devices. The first time window is one time unit with a minimum length. In other words, the first time window may be understood as a shortest time period required by the first electronic device to send a packet by using technologies of all discover devices or a plurality of technologies of all discover devices, and is not separable in terms of time. In embodiments of this application, a length of the first time window may be a microsecond, a millisecond, or a second.

For example, the first time window includes a plurality of slots or a plurality of symbols.

In a possible implementation of the second aspect, the method further includes the first electronic device broadcasts a third packet in the first time window by using a third communication technology, where the third packet is used to query a communication technology capability of another device; and the third communication technology conflicts with the first communication technology. In this implementation, the first electronic device separately broadcasts a packet in the time window by simultaneously using a plurality of non-conflicting communication technologies (to be specific, time periods in which the plurality of non-conflicting communication technologies are used to broadcast a packet overlap in time domain, and may partially or completely overlap). In the time window, the first electronic device simultaneously broadcasts a packet by using another communication technology. If the another communication technology conflicts with a communication technology used to broadcast a packet in the time window, the plurality of mutually conflicting communication technologies are used to send broadcast packets in a time division manner in the time window. In a heterogeneous network, a requirement of a business service on a discover and connection capability of a device having a plurality of different technical capabilities is met, and user experience is improved.

For example, in embodiments of this application, "simultaneously sending" may be understood as: In a time length of one time window, the electronic device separately broadcasts a packet in the time window by simultaneously using a plurality of non-conflicting communication technologies (to be specific, time periods in which the plurality of non-conflicting communication technologies are used to broadcast a packet overlap in time domain, and may partially or completely overlap. For example, the plurality of non-conflicting communication technologies may separately and simultaneously start broadcasting a packet). Based on this, in the time window, another communication technology is simultaneously used to broadcast a packet. If the another communication technology conflicts with a communication technology used to broadcast a packet in the time window, the plurality of mutually conflicting communication technologies are used to send service query requests in a time division manner in the time window. In other words, "simultaneously sending" in embodiments of this application may be understood as: The electronic device needs to simultaneously broadcast a packet by using a plurality of different communication technologies in a time granularity of one time window.

For example, the plurality of different communication technology capabilities of the first electronic device include: a plurality of capabilities such as BT, Wi-Fi, NFC, Zigbee, USB, cellular, and the like.

For example, the first electronic device and the second electronic device include but are not limited to a smart television, a large-screen device, a mobile phone, a tablet computer, a notebook computer, a large-screen television, a smart home product, a PDA, a vehicle-mounted computer, and the like.

In a possible implementation of the first aspect or the second aspect, the first packet indicates a communication technology capability of the first electronic device or indicates a communication technology used by the first electronic device to broadcast a packet. In this implementation, the second electronic device may learn the communication technology capability of the first electronic device, so that the second electronic device establishes a communication connection to the first electronic device based on the communication technology capability of the first electronic device. This improves efficiency of establishing the communication connection.

For example, the communication technology capabilities of the first electronic device include: a plurality of capabilities such as BT, Wi-Fi, NFC, Zigbee, USB, cellular, and the like.

In a possible implementation of the first aspect or the second aspect, both the first packet and the second packet include a first random code of the first electronic device. The first random code is randomly generated by the first electronic device. The first electronic device may generate different first random codes at different time points, and the first random codes uniquely identify the first electronic device. In this implementation, a same random code carried in different packets identifies that both the first packet and the second packet are from the first electronic device. This is easy to implement, saves communication resources, and has high accuracy.

In a possible implementation of the first aspect or the second aspect, the response information includes a second random code of the second electronic device, and indication information that indicates a communication technology capability of the second electronic device. The random code is randomly generated by the second electronic device. The second electronic device may generate different random codes at different time points, and the random codes uniquely identify the second electronic device. In this implementation, the first electronic device may learn the communication technology capability of the second electronic device, so that the first electronic device establishes a communication connection to the second electronic device based on the communication technology capability of the second electronic device. This improves efficiency of establishing the communication connection. In addition, a same random code carried in different packets identifies that both the first packet and the second packet are from the first electronic device. This is easy to implement, saves communication resources, and has high accuracy.

In a possible implementation of the first aspect or the second aspect, before the first electronic device establishes a communication connection to the second electronic device based on the communication technology capability supported by the second electronic device, the method further includes the first electronic device determines, based on the second random code, that the response information is from the second electronic device; and the first electronic device obtains network identifier information of the second electronic device based on the response information, where the network identifier information of the second electronic device includes a media access control (MAC) address or an Internet Protocol (IP) address of the second electronic device. In this implementation, the second electronic device is identified by using the network identifier information of the second electronic device. The network identifier information of the second electronic device may be changeable, and may be dynamically extended and updated based on a change of a capability supported by the second electronic device. Therefore, the network identifier information of the second electronic device may be dynamically extended. The network identifier information of the second electronic device identifies a device, which may effectively prevent identifier (ID) information of the device from being traced, resolve a problem in a conventional technology that when a unique ID of the device identifies a device, the ID is prone to be traced, and improve security of the device.

For example, the network identifier information of the second electronic device includes: BT MAC, Wi-Fi MAC, USB MAC and IP. In other words, the network identifier information of the second electronic device includes four parameters of the second electronic device, where the four parameters are respectively: a BT MAC address of the second electronic device, a Wi-Fi MAC address of the second electronic device, a USB MAC address of the second electronic device, and an IP address of the second electronic device.

For example, the first electronic device receives one or more pieces of response information that are sent by the second electronic device, and different response information is broadcast or sent by the second electronic device by using different communication technologies.

In a possible implementation of the first aspect or the second aspect, after the first electronic device receives the response information sent by the second electronic device, the method further includes the first electronic device receives first information sent by the second electronic device, where the first information includes a network identifier of the second electronic device; and the first electronic device determines, based on the network identifier information of the second electronic device and the network identifier of the second electronic device that is carried in the first information, that the first information is from the second electronic device. In this implementation, the first electronic device compares the network identifier of the second electronic device included in the first information with the previously stored network identifier information of the second electronic device, to determine that the first information is sent by the second electronic device, to be specific, perform deduplication processing on the device. Further, content included in the plurality of pieces of information sent by the second electronic device may be filtered and shared. In this way, a plurality of times of interaction between the first electronic device and the second electronic device may be avoided, to reduce signaling overheads and improve resource utilization.

In a possible implementation of the first aspect or the second aspect, before the first electronic device establishes a communication connection to the second electronic device based on the communication technology capability supported by the second electronic device, the method further includes the first electronic device determines, based on the communication technology capability supported by the second electronic device, a communication technology capability set supported by both the first electronic device and the second electronic device; the first electronic device in the communication technology capability set sends a connection request to the second electronic device based on a to-be-transmitted service, where the connection request includes connection information corresponding to one or more communication technologies respectively; and the first electronic device establishes a communication connection to the second electronic device by using the one or more communication technologies. In this implementation, the first electronic device may establish the communication connection to the second electronic device by using one or more communication technologies, to improve communication connection efficiency, and meet different requirements of service transmission.

For example, the connection request includes standard request information defined in a protocol corresponding to one or more optimal connection manners (such as Wi-Fi, Bluetooth, and the like), for example, may include information such as a connection address, a connection window, and a security requirement.

For example, the first electronic device may predefine a connection strategy, and for a large-bandwidth service, during near field transmission, different capabilities are sorted in descending order of priorities. During far field transmission, different capabilities (namely, technologies) are sorted in descending order of priorities. When the first electronic device is connected to the second electronic device, the first electronic device may select, based on priorities of the foregoing different capabilities, a manner with a highest priority from capabilities supported by both the first electronic device and the second electronic device to be connected to a large-screen device. Alternatively, the first several manners with high priorities are selected to be connected to the second electronic device.

In a possible implementation of the first aspect or the second aspect, with a plurality of connections for service transmission between the first electronic device and the second electronic device, the first electronic device may monitor a communication delay in each connection process, information of a bandwidth in each connection process, and the like in a plurality of connection processes, dynamically adjust a manner of subsequently establishing a connection to the second electronic device, and dynamically adjust a priority order of different capabilities. Further, efficiency of communication connection is improved.

In a possible implementation of the first aspect or the second aspect, the first electronic device sends, by using the one or more communication technologies that have established the communication connection, data of the to-be-transmitted service to the second electronic device. In this implementation, when a plurality of connections simultaneously exist between the first electronic device and the second electronic device, the first electronic device may select one of the optimal connections, or simultaneously select a plurality of connections to transmit data to the second electronic device. This improves efficiency of data transmission between the first electronic device and the second electronic device, and further improves user experience.

According to a third aspect, a method for discovering and connecting to an electronic device is provided. The method includes a second electronic device receives, in a first time period, a first packet broadcast by a first electronic device by using a first communication technology, where the first packet is used to query a communication technology capability of another device; the second electronic device receives, in a second time period, a second packet broadcast by the first electronic device by using a second communication technology, where the second packet is used to query a communication technology capability of another device, and the first time period overlaps with the second time period; the second electronic device sends, response information to the first electronic device based on the first packet and the second packet; the second electronic device receives a connection request sent by the first electronic device; and the second electronic device establishes a communication connection to the first electronic device based on the connection request.

According to the method for discovering and connecting to an electronic device provided in the third aspect, the first electronic device separately broadcasts a packet in an overlapping time period by using a plurality of communication technologies. In other words, time periods in which the first electronic device separately broadcasts a packet by using a plurality of different communication technologies overlap (partially or completely overlap) in time domain. In other words, technologies of all discover devices of a same electronic device or a plurality of technologies of all discover devices are used to simultaneously send (simultaneously broadcast) packets, to meet a requirement of a business service on discover and connection capabilities of the device having a plurality of different technical capabilities in a heterogeneous network, so that more devices supporting a distribution capability may be actively discovered. This implements convergence of a plurality of discover and connection technologies, improves efficiency of discovering and connecting to the electronic device, and improves user experience.

In a possible implementation of the third aspect, the method further includes the second electronic device receives, in a third time period, a third packet broadcast by the first electronic device by using a third communication technology, where the third packet is used to query a communication technology capability of another device; and the third communication technology conflicts with the first communication technology, the first time period does not overlap with the third time period in time domain, and the second time period overlaps with the third time period. In this implementation, when the first electronic device simultaneously and separately broadcasts packets by using mutually conflicting (for example, a conflict exists on a channel, an air interface time sequence, or the like) communication technologies, time periods in which the first electronic device separately sends service query requests by using the mutually conflicting communication technologies do not overlap in time domain, but time periods in which the first electronic device separately broadcasts packets by using a plurality of non-conflicting communication technologies overlap in time domain (partially or completely overlap). In this way, technologies of all discover devices of a same electronic device or a plurality of technologies of all discover devices are used to simultaneously send (simultaneously broadcast) packets, to meet a requirement of a business service on discover and connection capabilities of the device having a plurality of different technical capabilities in a heterogeneous network, and improve user experience.

According to a fourth aspect, a method for discovering and connecting to an electronic device is provided. The method includes a second electronic device receives, in a first time window, a first packet broadcast by a first electronic device by using a first communication technology, where the first packet is used to query a communication technology capability of another device; the second electronic device receives, in the first time window, a second packet broadcast by the first electronic device by using a second communication technology; the second electronic device sends, response information to the first electronic device based on the first packet and the second packet; the second electronic device receives a connection request sent by the first electronic device; and the second electronic device establishes a communication connection to the first electronic device based on the connection request.

According to the method for discovering and connecting to an electronic device provided in the fourth aspect, the first electronic device simultaneously sends a packet by using a plurality of different communication technologies in a time granularity of a same time window by using the plurality of communication technologies. Technologies of all discover devices of a same electronic device or a plurality of technologies or all discover devices are used to simultaneously send (simultaneously broadcast) packets, to meet a requirement of a business service on discover and connection capabilities of the device having a plurality of different technical capabilities in a heterogeneous network, so that more devices supporting a distribution capability may be actively discovered. This implements convergence of a plurality of discover and connection technologies, improves efficiency of discovering and connecting to the electronic device, and improves user experience.

In a possible implementation of the fourth aspect, the method further includes the second electronic device receives, in the first time window, a third packet broadcast by the first electronic device by using a third communication technology, where the third packet is used to query a communication technology capability of another device, and the third communication technology conflicts with the first communication technology. In this implementation, the first electronic device separately broadcasts a packet in the time window by simultaneously using a plurality of non-conflicting communication technologies (to be specific, time periods in which the plurality of non-conflicting communication technologies are used to broadcast a packet overlap in time domain, and may partially or completely overlap). In the time window, the first electronic device simultaneously broadcasts a packet by using another communication technology. If the another communication technology conflicts with a communication technology used to broadcast a packet in the time window, the plurality of mutually conflicting communication technologies are used to send broadcast packets in a time division manner in the time window. In a heterogeneous network, a requirement of a business service on a discover and connection capability of a device having a plurality of different technical capabilities is met, and user experience is improved.

For example, the plurality of different communication technology capabilities of the first electronic device or the second electronic device include: a plurality of capabilities such as BT, Wi-Fi, NFC, Zigbee, USB, cellular, and the like.

For example, the first electronic device and the second electronic device include but are not limited to a smart television, a large-screen device, a mobile phone, a tablet computer, a notebook computer, a large-screen television, a smart home product, a PDA, a vehicle-mounted computer, and the like.

In a possible implementation of the third aspect or the fourth aspect, the first packet indicates a communication technology capability of the first electronic device or indicates a communication technology used by the first electronic device to broadcast a packet. In this implementation, the second electronic device may learn the communication technology capability of the first electronic device, so that the second electronic device establishes a communication connection to the first electronic device based on the communication technology capability of the first electronic device. This improves efficiency of establishing the communication connection.

In a possible implementation of the third aspect or the fourth aspect, both the first packet and the second packet include a first random code of the first electronic device. The random code is randomly generated by the first electronic device. The first electronic device may generate different random codes at different time points, and the random codes uniquely identify the first electronic device. In this implementation, a same random code carried in different packets identifies that both the first packet and the second packet are from the first electronic device. This is easy to implement, saves communication resources, and has high accuracy.

In a possible implementation of the third aspect or the fourth aspect, before the second electronic device establishes a communication connection to the first electronic device based on the connection request, the method further includes the second electronic device determines, based on the first random code, that both the first packet and the second packet are from the first electronic device; and the second electronic device obtains network identifier information of the first electronic device based on the first packet and the second packet, where the network identifier information of the first electronic device includes a MAC address or an IP address of the first electronic device. In this implementation, the first electronic device is identified by using the network identifier information of the first electronic device. The network identifier information of the first electronic device may be changeable, and may be dynamically extended and updated based on a change of a capability supported by the first electronic device. Therefore, the network identifier information of the first electronic device may be dynamically extended. The network identifier information of the first electronic device identifies a device, which may effectively prevent ID information of the device from being traced, resolve a problem in a conventional technology that when a unique ID of the device identifies a device, the ID is prone to be traced, and improve security of the device.

For example, the network identifier information of the first electronic device includes: BT MAC, Wi-Fi MAC, NFC MAC, USB MAC, and IP. In other words, the network identifier information of the first electronic device includes five parameters of the first electronic device, where the five parameters are respectively: a BT MAC address of the first electronic device, a Wi-Fi MAC address of the first electronic device, an NFC MAC address of the first electronic device, a USB MAC address of the first electronic device, and an IP address of the first electronic device.

In a possible implementation of the third aspect or the fourth aspect, after the second electronic device receives the first packet and the second packet, the method further includes the second electronic device receives second information sent by the first electronic device, where the second information includes a network identifier of the first electronic device; and the second electronic device determines, based on the network identifier information of the first electronic device and the network identifier of the first electronic device that is carried in the second information, that the second information is from the first electronic device. In this implementation, the second electronic device compares the network identifier of the first electronic device included in the second information with the previously stored network identifier information of the first electronic device, to determine that the second information is sent by the first electronic device, to be specific, perform deduplication processing on the device. Further, content included in the plurality of pieces of information sent by the first electronic device may be filtered and shared. In this way, a plurality of times of interaction between the first electronic device and the second electronic device may be avoided, to reduce signaling overheads and improve resource utilization.

In a possible implementation of the third aspect or the fourth aspect, that the second electronic device sends response information to the first electronic device based on the first packet and the second packet includes the second electronic device sends first response information to the first electronic device in a fourth time period by using a fourth communication technology; and the second electronic device sends second response information to the first electronic device in a fifth time period by using a fifth communication technology, where the fourth time period overlaps with the fifth time period. In this implementation, the second electronic device separately broadcasts a packet in an overlapping time period by using a plurality of communication technologies, to be specific, separately sends response information (broadcast a packet) to the first electronic device by using a plurality of different communication technologies. Time periods in which a plurality of pieces of response information are sent overlap (partially or completely overlap) in time domain. In other words, technologies of all discover devices of a same electronic device or a plurality of technologies of all discover devices are used to simultaneously send packets, to meet a requirement of a business service on discover and connection capabilities of the device having a plurality of different technical capabilities in a heterogeneous network. This implements convergence of a plurality of discover and connection technologies, improves efficiency of discovering and connecting to the electronic device, and improves user experience.

In a possible implementation of the third aspect or the fourth aspect, the method further includes the second electronic device sends third response information to the first electronic device in a sixth time period by using a sixth communication technology, where the sixth communication technology conflicts with the fourth communication technology, the fourth time period does not overlap with the sixth time period in time domain, and the fifth time period overlaps with the sixth time period. In this implementation, when the second electronic device separately sends response information (broadcasts packets) by using mutually conflicting communication technologies (for example, a conflict exists in a channel or an air interface time sequence), time periods in which the first electronic device separately sends packets by using the mutually conflicting communication technologies do not overlap in time domain, but time periods in which the first electronic device sends packets by using a plurality of non-conflicting communication technologies overlap in time domain (partially or completely overlap). In this way, technologies of all discover devices of a same electronic device or a plurality of technologies of all discover devices are used to simultaneously send packets, to meet a requirement of a business service on discover and connection capabilities of the device having a plurality of different technical capabilities in a heterogeneous network, and improve user experience.

In a possible implementation of the third aspect or the fourth aspect, that the second electronic device sends response information to the first electronic device based on the first packet and the second packet includes the second electronic device sends first response information to the first electronic device in a second time window by using a fourth communication technology; and the first electronic device sends second response information to the first electronic device in the second time window by using a fifth communication technology. In this implementation, the second electronic device simultaneously sends a packet by using a plurality of different communication technologies in a time granularity of a same time window by using the plurality of communication technologies. Technologies of all discover devices of a same electronic device or a plurality of technologies of all discover devices are used to simultaneously send packets, to meet a requirement of a business service on discover and connection capabilities of the device having a plurality of different technical capabilities in a heterogeneous network. In this way, convergence of a plurality of discover and connection technologies is supported, efficiency of discovering and connecting to an electronic device is improved, and user experience is improved.

In a possible implementation of the third aspect or the fourth aspect, the response information includes a second random code of the second electronic device, and indication information that indicates a communication technology capability of the second electronic device. In this implementation, the second random code is randomly generated by the second electronic device. The second electronic device may generate different second random codes at different time points, and the second random codes uniquely identify the second electronic device. A same random code carried in different response information identifies that both the first response information and the second response information are from the second electronic device. This is easy to implement, saves communication resources, and has high accuracy. In addition, the first electronic device may learn the communication technology capability of the second electronic device, so that the first electronic device establishes a communication connection to the second electronic device based on the communication technology capability of the second electronic device. This improves efficiency of establishing the communication connection.

In a possible implementation of the third aspect or the fourth aspect, the connection request includes connection information corresponding to one or more communication technologies. In this implementation, the first electronic device may establish the communication connection to the second electronic device by using one or more communication technologies, to improve communication connection efficiency, and meet different requirements of service transmission.

For example, the connection request includes standard request information defined in a protocol corresponding to one or more optimal connection manners (such as Wi-Fi, Bluetooth, and the like), for example, may include information such as a connection address, a connection window, and a security requirement.

In a possible implementation of the third aspect or the fourth aspect, the method further includes the second electronic device receives, by using one or more communication technologies that have established the communication connection, data of a to-be-transmitted service sent by the first electronic device. In this implementation, when a plurality of connections simultaneously exist between the first electronic device and the second electronic device, the first electronic device may select one of the optimal connections, or simultaneously select a plurality of connections to transmit data to the second electronic device. This improves efficiency of data transmission between the first electronic device and the second electronic device, and further improves user experience.

According to a fifth aspect, an electronic device is provided. The electronic device includes units configured to perform the steps in the first aspect or any possible implementation of the first aspect, or units configured to perform the steps in the second aspect or any possible implementation of the second aspect.

According to a sixth aspect, an electronic device is provided. The electronic device includes units configured to perform the steps in the third aspect or any possible implementation of the third aspect, or units configured to perform the steps in the fourth aspect or any possible implementation of the fourth aspect.

According to a seventh aspect, an electronic device is provided. The electronic device includes at least one processor and a memory, and the at least one processor is configured to perform the method according to the first aspect or any possible implementation of the first aspect, or the method according to the second aspect or any possible implementation of the second aspect.

According to an eighth aspect, an electronic device is provided. The electronic device includes at least one processor and a memory, and the at least one processor is configured to perform the method according to the third aspect or any possible implementation of the third aspect, or the method according to the fourth aspect or any possible implementation of the fourth aspect.

According to a ninth aspect, an electronic device is provided. The electronic device includes at least one processor and an interface circuit, and the at least one processor is configured to perform the method according to the first aspect or any possible implementation of the first aspect, or the method according to the second aspect or any possible implementation of the second aspect.

According to a tenth aspect, an electronic device is provided. The electronic device includes at least one processor and an interface circuit, and the at least one processor is configured to perform the method according to the third aspect or any possible implementation of the third aspect, or the method according to the fourth aspect or any possible implementation of the fourth aspect.

According to an eleventh aspect, a communication apparatus is provided. The communication apparatus includes any electronic device provided in the fifth aspect, the seventh aspect, or the ninth aspect.

According to a twelfth aspect, a communication apparatus is provided. The communication apparatus includes any electronic device provided in the sixth aspect, the eighth aspect, or the tenth aspect.

According to a thirteenth aspect, a communication system is provided. The communication system includes any electronic device provided in the fifth aspect, the seventh aspect, the ninth aspect, or the eleventh aspect, and any electronic device provided in the sixth aspect, the eighth aspect, the tenth aspect, or the twelfth aspect.

According to a fourteenth aspect, a computer program product is provided. The computer program product includes a computer program; and when the computer program is executed by a processor, the computer program is configured to perform the method in any one of the first aspect to the fourth aspect, or is configured to perform the method in any possible implementation of any one of the first aspect to the fourth aspect.

According to a fifteenth aspect, a computer-readable storage medium is provided. The computer-readable storage medium stores a computer program. When the computer program is executed, the computer program is configured to perform the method in any one of the first aspect to the fourth aspect, or is configured to perform the method in any possible implementation of any one of the first aspect to the fourth aspect.

According to a sixteenth aspect, a chip is provided. The chip includes a processor, configured to invoke a computer program from a memory and run the computer program, to enable a communication device in which the chip is installed to perform the method in any one of the first aspect to the fourth aspect, or is configured to perform the method in any possible implementation of any one of the first aspect to the fourth aspect.

According to the method for discovering and connecting to an electronic device and the electronic device provided in this application, technologies of all discover devices of a same electronic device or a plurality of technologies of all discover devices are used to simultaneously broadcast or simultaneously send packets, to meet a requirement of a business service on discover and connection capabilities of the device having a plurality of different technical capabilities in a heterogeneous network, so that the plurality of discover and connection technologies may be used in parallel, to improve efficiency of device discovery, and improve user experience. In addition, identifying one device by using network identifier information of a device may avoid a problem that an ID is prone to be traced when a unique device ID is usually used to identify the device in the current industry, effectively prevent ID information of the device from being traced, improve security of the device, and meet a requirement that when a device capability dynamically changes, the network identifier information dynamically changes accordingly. Further, device deduplicati on is performed by using a network identifier of a device, to filter out repeated information. In addition, during device connection, a capability supported by a peer device may be obtained, so that an optimal connection technology and a connection capability may be selected based on a service and a scenario to perform connection, to improve user experience.

DESCRIPTION OF EMBODIMENTS

Figure 1:
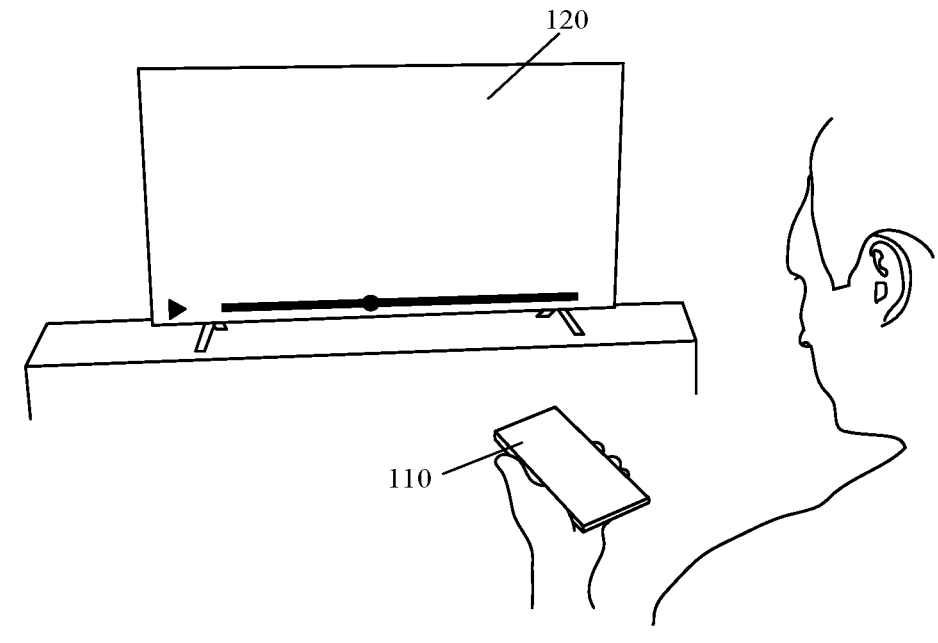
FIG. 1 is a schematic diagram of an example of an application scenario to which embodiments of this application are applicable according to this application.

The following describes technical solutions of this application with reference to the accompanying drawings.

In descriptions of embodiments of this application, unless otherwise specified, "I" means "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In descriptions of this embodiment, unless otherwise stated, "a plurality of" means two or more.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain and/or carry instructions and/or data.

The electronic device in embodiments of this application may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. Alternatively, the terminal device may be a cellular phone, a cordless phone, a Session Initiation Protocol (SIP) phone, a wireless local loop (WLL) station, a personal digital assistant (PDA), a handheld device having a wireless or wired communication function, a computing device, another processing device connected to a wireless modem, a vehicle-mounted device, a wearable device, a terminal device in a $5^{th}$ Generation (5G) network, a terminal device in a future evolved public land mobile communication network (PLMN), or the like. The terminal device may be a smart television, a large-screen device, a smart screen, a smartphone, a smart speaker, a notebook computer, a tablet computer, a vehicle-mounted remote information processor (T-BOX), a vehicle-mounted infotainment device, or the like. This is not limited in embodiments of this application.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a CD and a DVD), a smart card, and a flash memory component (for example, an EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain and/or carry instructions and/or data.

In a wireless communication network, a plurality of wireless technology and wired technology solutions are involved, such as a BT technology, a Wi-Fi technology, an NFC technology, a Zigbee technology, a USB technology, a cellular communication technology, and the like. Currently, different types of terminal devices may have communication capabilities of a plurality of wireless technologies or wired technologies. Due to differences in device capabilities (for example, a memory size, power consumption, and the like) and differences in capabilities (for example, a transmission distance, a bandwidth, and the like) of different wireless technologies, different technologies are usually used to be connected to and communicate with other devices on different devices (for example, a large-screen device, a vehicle-mounted infotainment, a sound box, a watch, a smart switch, and the like).

For example, one electronic device may communicate with another device in an out-of-band data (OOB) manner. The OOB is a standard processing manner, and essence of the OOB is the following: First, a first discover and connection technology is used to discover a device, connection information of a second connection technology is exchanged in a discover device process, and finally, a connection between devices and data transmission is performed through the second connection technology. For example, one device discovers another device in an NFC touching manner. In a process of discovering the another device by using the NFC, the two devices exchange connection information of Bluetooth with each other, and finally establish the connection between the two devices and perform data transmission in a Bluetooth manner. In this way, a discover delay of a Bluetooth technology may be effectively shortened, and a device is discovered in an NFC touching manner instead of a Bluetooth scanning manner. This improves convenience of a user operation.

However, when the OOB manner is used to discover the device, actually, only one technical means is used to discover the device. In other words, when a device discovers another device, even if the device has capabilities of a plurality of wireless technologies, only one wireless technology of the device may be used to discover another device, which cannot meet a requirement of a business service on the device having capabilities of a plurality of wireless technologies in a heterogeneous network architecture, and user experience is poor.

When a device has capabilities of a plurality of wireless technologies and wired technologies, there is another manner for performing discovering and connection between two devices. In other words, based on priorities of the plurality of wireless technologies and wired technologies of the device, a high-priority wireless or wired technology is first used for scanning for a period of time, and after the scanning time period ends, a low-priority technology is started for scanning for a period of time. After another device is scanned, a device connection operation is performed. In this manner, actually, one technical means is still used to discover a device, which cannot meet a requirement of a business service on the device having the plurality of wireless technology capabilities in a heterogeneous network architecture, and user experience is poor.

In view of this, this application provides a method for discovering and connecting to an electronic device. Technologies of all discover devices of a same electronic device or a plurality of technologies of all discover devices are used to simultaneously discover another device. In addition, one or more optimal technologies are selected based on different service requirements, network environments, and the like to perform device connection and data transmission. This supports convergence of a plurality of discover and connection technologies, meets a requirement of a business service on discover and connection capabilities of the device having a plurality of different technical capabilities in a heterogeneous network, and improves user experience.

FIG. 1 is a schematic diagram of an example of an application scenario to which embodiments of this application are applicable according to this application. FIG. 1 is a schematic diagram of a home scenario. The scenario shown in FIG. 1 includes a first electronic device and a second electronic device. In FIG. 1, the first electronic device uses that a user uses a smartphone 110 as an example, and the second electronic device uses a large-screen device 120 in a home as an example. The smartphone 110 may support technologies or capabilities of a plurality of discover devices. For example, the smartphone 110 may support: a plurality of capabilities of BT, Wi-Fi, NFC, Zigbee, USB, cellular, and the like. The large-screen device 120 supports: a plurality of capabilities of BT, Wi-Fi, NFC, USB, cellular, and the like. When the user discovers and connects to the large-screen device 120 by using the smartphone 110, the method for discovering and connecting to an electronic device provided in this application may be used. The smartphone 110 may simultaneously discover the large-screen device 120 by using technologies such as a BT technology, Wi-Fi, NFC, Zigbee, USB, cellular, and the like, and select one of the optimal technologies based on a service, a network environment, or the like to perform device connection and data transmission.

It should be understood that FIG. 1 is merely an example, and should not impose any limitation on an application scenario applicable to embodiments of this application. For example, the application scenario shown in FIG. 1 may further include another household device, for example, a personal computer, a PAD, or the like. When the user discovers and connects to these devices by using the smartphone 110, the user may also use the method for discovering and connecting to an electronic device provided in this application.

Figure 2:
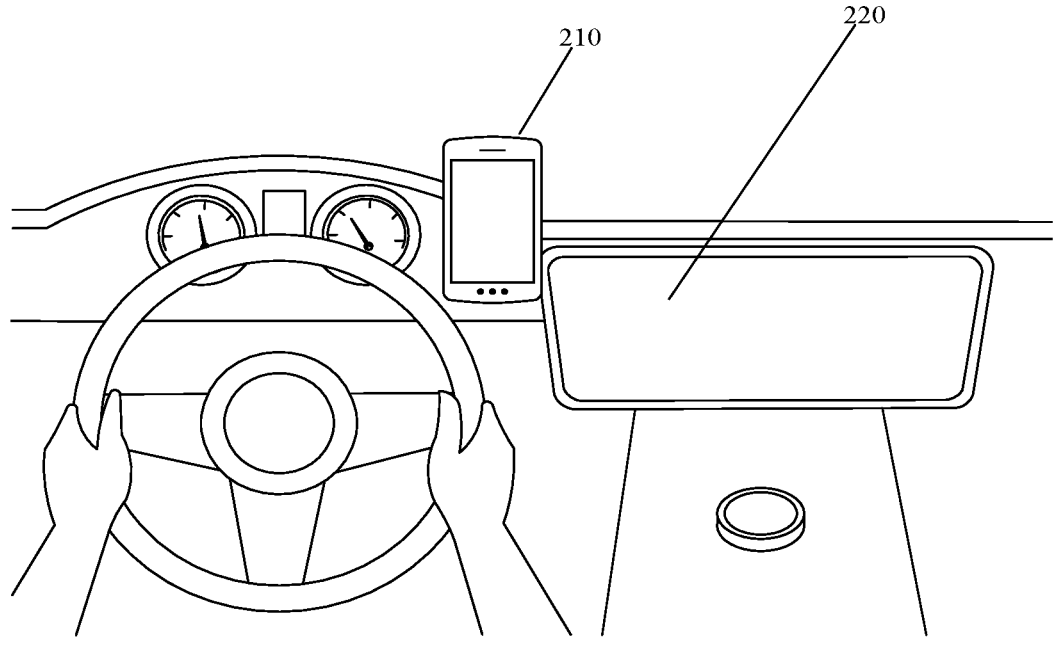
FIG. 2 is a schematic diagram of another example of an application scenario to which embodiments of this application are applicable according to this application.

FIG. 2 is a schematic diagram of another example of an application scenario to which embodiments of this application are applicable according to this application. FIG. 2 is a schematic diagram of an internet of vehicles scenario. The scenario shown in FIG. 2 includes a first electronic device and a second electronic device. In FIG. 2, the first electronic device uses that a user uses a smartphone 210 as an example, and the second electronic device uses a vehicle-mounted device 220 as an example. The vehicle-mounted device 220 may include an electronic control unit (ECU) in a vehicle, a trip computer, a vehicle-mounted computer, a vehicle-mounted T-BOX, or the like. This is not limited in embodiments of this application. The smartphone 210 may support technologies or capabilities of a plurality of discover devices. For example, the smartphone 210 may support: a plurality of capabilities of BT, Wi-Fi, NFC, Zigbee, USB, cellular, and the like. The vehicle-mounted device 220 supports: a plurality of capabilities of BT, Wi-Fi, NFC, USB, cellular, and the like. When the user discovers and connects to the vehicle-mounted device 220 by using the smartphone 210, the method for discovering and connecting to an electronic device provided in this application may be used. The smartphone 210 may simultaneously discover the vehicle-mounted device 220 by using technologies such as a BT technology, Wi-Fi, NFC, Zigbee, USB, cellular, and the like, and select one of the optimal technologies based on a service, a network environment, or the like to perform device connection and data transmission.

It should be understood that FIG. 2 is merely an example, and should not impose any limitation on an application scenario applicable to embodiments of this application. For example, the application scenario shown in FIG. 2 may further include another vehicle-mounted device, user equipment, and the like. This is not limited in embodiments of this application.

It should be further understood that in embodiments of this application, BT may include classic Bluetooth and Bluetooth Low Energy (BLE) Bluetooth. The classic Bluetooth includes at least one of two types of Bluetooth: Bluetooth basic rate (BR) and Bluetooth enhanced data rate (EDR).

It should be further understood that FIG. 1 and FIG. 2 are merely examples for describing application scenarios of embodiments of this application. The method for discovering and connecting to an electronic device provided in this application may be further applied to another scenario. This is not limited in embodiments of this application.

Figure 3:
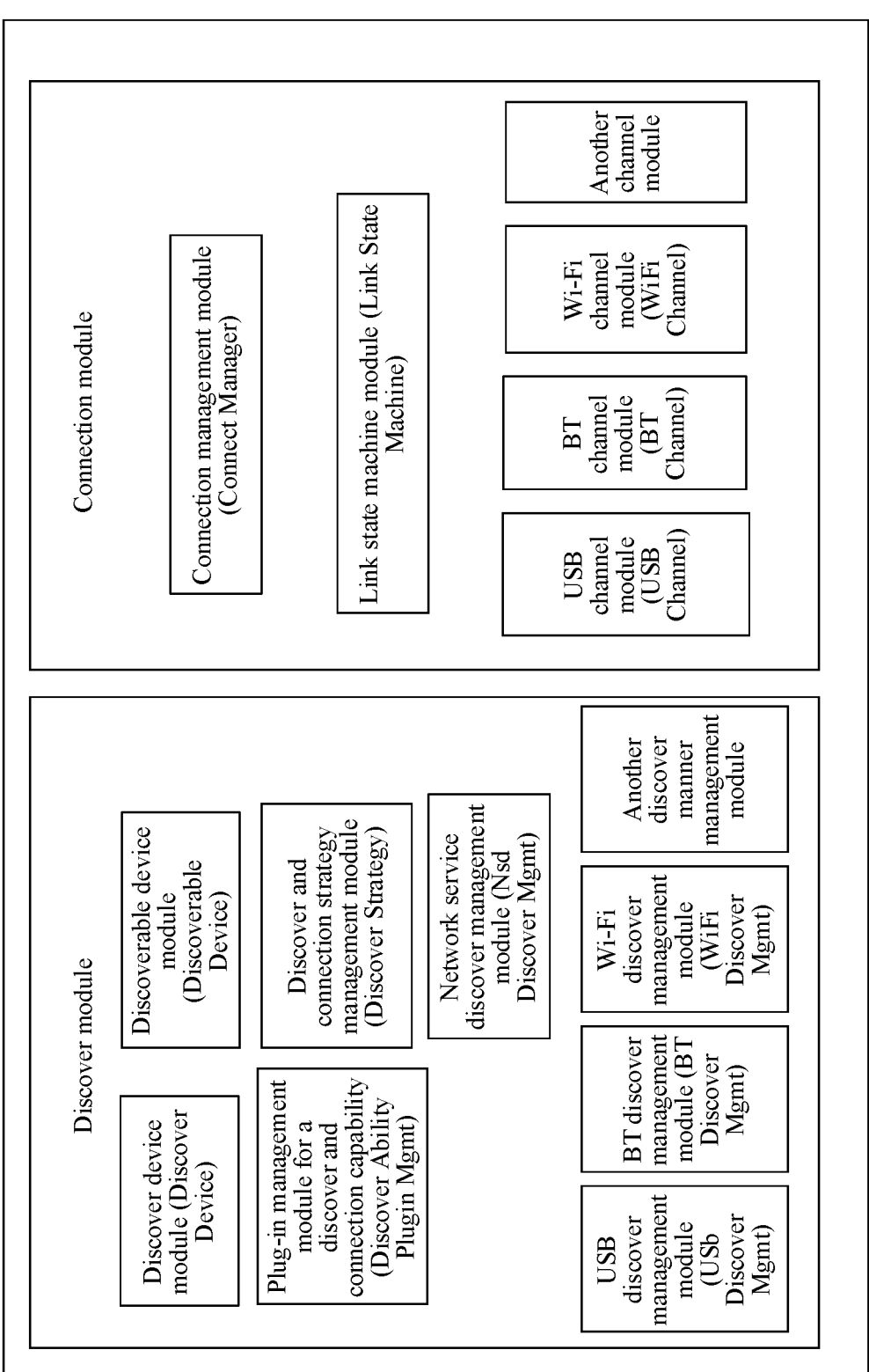
FIG. 3 is a schematic diagram of an example of a system architecture of an electronic device according to this application.

FIG. 3 is a schematic diagram of a system architecture of an electronic device according to this application. As shown in FIG. 3, the system architecture mainly includes a discover module and a connection module. The discover module may include: a discover device module and/or a discoverable device module, a plug-in management module for a discover and connection capability, a discover and connection strategy management module, a network service discover management module, a USB discover management module, a BT discover management module, a Wi-Fi discover management module, another discover manner management module, and the like. The connection module includes a connection management module, a link state machine module, a USB channel module, a BT channel module, a Wi-Fi channel module, another channel module, and the like.

It should be understood that in embodiments of this application, a system architecture of the electronic device may include two modules: a discover device module and a discoverable device module that are shown in FIG. 3, or may include any one of a discover device module and a discoverable device module. If the electronic device includes two modules: the discover device module and the discoverable device module, the electronic device may have an active discover function and a passive discover function. In other words, the electronic device may be a discover device or a discoverable device. If the electronic device includes the discover device module, but does not include the discoverable device module, the electronic device has an active discover function, and does not have a passive discover function. In other words, the electronic device is the discover device. If the electronic device includes a discoverable device, but does not include the discover device module, the electronic device may have the passive discover function, and does not have the active discover function. In other words, the electronic device is the discoverable device.

The discover device module (Discover Device) includes two discover modes: an active discover mode (active mode) and a passive discover mode (passive mode). The discoverable device module (Discoverable Device) also includes two discover modes: an active discover mode (active mode) and a passive discover mode (passive mode).

The discover device module is mainly responsible for managing a capability of the discover device. The discover device module is responsible for managing various different capabilities (such as capabilities such as BT, Wi-Fi, NFC, Zigbee, USB, cellular, and the like) on the discover device through the plug-in management module for discovering a connection capability; and scheduling BT, Wi-Fi, NFC, Zigbee, USB, cellular, or another discover capability at a bottom layer through the discover and connection strategy management module.

A function of the discoverable device module is similar to a function of the discover device module, and is mainly responsible for a capability of the discoverable device.

The plug-in management module of the discover and connection capability is responsible for registering and managing various capabilities (such as BT, Wi-Fi, NFC, Zigbee, USB, cellular, and the like) on the device.

The discover and connection strategy management module is responsible for coordination and scheduling between various capabilities (namely, various connection technologies) on the device.

The connection management module and the link state machine module are responsible for negotiating and providing suggestions for various capability (namely, various connection technologies) connections.

The discover management module and channel module of various connection technologies are responsible for discovering specific connection technologies (such as BT, Wi-Fi, NFC, Zigbee, USB, cellular, and the like) and implementing connection behaviors.

It should be understood that FIG. 3 is merely an example, and should not impose any limitation on the system architecture of the electronic device in this application. For example, in some other embodiments of this application, the system architecture of the electronic device may also use modules different from modules in the example shown in FIG. 3, more or fewer modules, a combination of a plurality of different module manners, or the like. This is not limited in embodiments of this application.

The following describes the discover device and the discoverable device in embodiments of this application.

The discover device may broadcast a packet to another surrounding device, or monitor a packet broadcast by another device, to discover a surrounding device having one or more services or capabilities, and prompt the user to select a device or a service for connection. In addition, the discover device actively initiates a connection request.

In other words, the discover device may obtain, in an active broadcast manner or passive monitoring manner, a service or a capability supported by a surrounding device, and is an initiator of a connection action between the discover device and another device.

In embodiments of this application, the capability of the surrounding device may be understood as various wireless and wired connection technologies of the surrounding device, including technologies or capabilities such as BT, Wi-Fi, NFC, Zigbee, USB, cellular, and the like. Services of the surrounding device may be understood as various services or services based on a capability supported by the device, for example, services such as file sharing, printing, and projection.

The discoverable device may notify the surrounding device of a capability and a service of the discoverable device by replying to a packet broadcast by the discover device or by feedback monitoring, so that the capability and the service of the discoverable device may be sensed by the surrounding device. The feedback monitoring (or may be referred to as a passive monitoring feedback manner) may be understood as: a manner in which the discover device (namely, a monitoring device) subscribes to (or monitors) information published by the discoverable device (namely, a monitored device), and the discoverable device actively broadcasts a packet, so that the discover device performs monitoring. The discoverable device receives a connection request from the discover device, and then performs binding authentication or authentication.

In other words, the discoverable device notifies the surrounding device of a service or a capability of the discoverable device in an active broadcast manner or a passive monitoring feedback manner, and the discover device is a receiver of a connection action between the discover device and another device.

The following describes an active discover manner and a passive discover manner in embodiments of this application.

Active discover manner: Active discover is that the discover device actively broadcasts a service query request to the surrounding device in a broadcast manner, and then waits for the discoverable device to reply service information or capability information that the discoverable device has. After receiving the service information or capability information replied by the discoverable device, the discover device provides the service information or the capability information for an upper-layer invoker to invoke.

The service query request actively broadcast by the discover device may carry a condition that the discover device expects the discoverable device to meet, for example, a device name, a device type, a device capability (for example, whether a capability such as audio or video is included), service information (for example, whether a projection service, a printing service, or the like is supported), and the like. The service information carried in the service query request mainly intends to be used by the discoverable device to match an expected service capability. For example, the service information may include: a service name, a service ID, a service attribute, and the like.

Optionally, the service query request may further carry capability information (for example, including a device name, a device type, a device capability, a service capability, or the like) of the discover device, to optimize a discover procedure and reduce an interaction procedure in a subsequent discover process.

Figure 4:
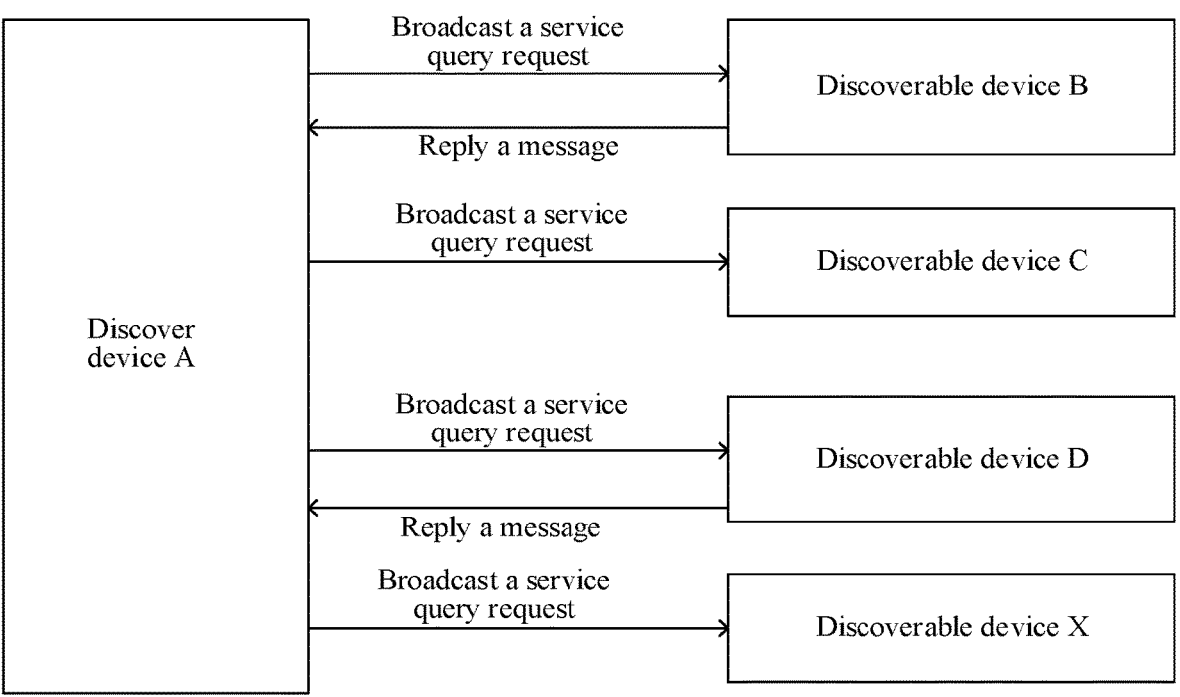
FIG. 4 is a schematic diagram of an example of a process in which a discover device discovers a surrounding device in an active discover manner according to this application.

For example, FIG. 4 is a schematic diagram of an example of a process in which a discover device discovers a surrounding device in an active discover manner according to this application. In the example shown in FIG. 4, the discover device is a device A, and discoverable devices include a device B, a device C, a device D, and a device X.

As shown in FIG. 4, the device A simultaneously broadcasts a service query request to the device B, the device C, the device D, and the device X. The service query request includes capability information and/or service information that needs to be supported by a target device. For example, a capability that needs to be supported by the target device may include: one or more of capabilities such as BT, Wi-Fi, NFC, Zigbee, USB, cellular, and the like. A service that needs to be supported by the target device may include: one or more of services such as file sharing, projection, printing, and the like. Optionally, the service query request may further include capability information of the device A, and the like.

After the device B, the device C, the device D, and the device X respectively receive the broadcast service query request, the device B determines, based on the service query request, whether the device B meets a broadcast requirement of the device A, for example, determines whether the device B supports a capability and a service that are required to be supported in the service query request. If the device B supports the capability and the service, the device B replies a message to the device A. The message includes the capability and the service that are supported by the device B.

Similarly, the device C determines, based on the service query request, whether the device C meets a broadcast requirement of the device A, for example, determines whether the device C supports the capability and the service that are required to be supported in the service query request. If the device C does not support the capability and the service, the device C does not reply a message to the device A.

The device D determines, based on the service query request, whether the device D meets a broadcast requirement of the device A, for example, determines whether the device B supports a capability and a service that are required to be supported in the service query request. If the device D supports the capability and the service, the device D replies a message to the device A. The message includes the capability and the service that are supported by the device D.

The device X determines, based on the service query request, whether the device X meets a broadcast requirement of the device A, for example, determines whether the device X supports a capability and a service that are required to be supported in the service query request. If the device X does not support the capability and the service, the device X does not reply a message to the device A.

Passive discover manner: The passive discover is that after the discover device passively subscribes to the service information or the capability information published by the surrounding device, the discover device monitors the capability information or the service information that is actively broadcast by the discoverable device.

Figure 5:
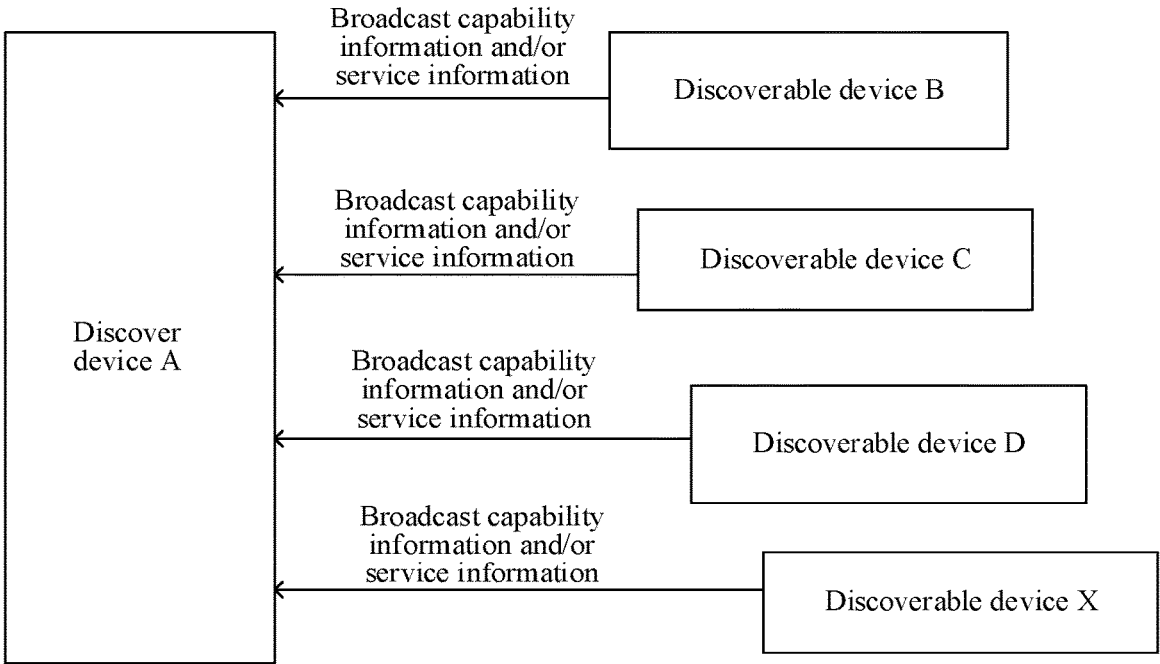
FIG. 5 is a schematic diagram of an example of a process in which a discover device discovers a surrounding device in a passive discover manner according to this application.

For example, FIG. 5 is a schematic diagram of an example of a process in which a discover device discovers a surrounding device in a passive discover manner according to this application. In the example shown in FIG. 5, the discover device is a device A, and discoverable devices include a device B, a device C, a device D, and a device X.

First, the device A subscribes to the service information or the capability information published by the device B, the device C, the device D, and the device X, and then the device A may start discovering and monitoring. The device B, the device C, the device D, and the device X respectively broadcast, at different time points, the capability information and/or the service information, and the like of the device B, the device C, the device D, and the device X. The device A may monitor the capability information and/or the service information respectively broadcast by the device B, the device C, the device D, and the device X. In this way, the device A may obtain or discover the capability information and/or the service information of the surrounding device.

Optionally, packets respectively broadcast by the device B, the device C, the device D, and the device X may further carry capability information of each device, and the like.

The following describes, with reference to a scenario shown in FIG. 1, a method for discovering and connecting to an electronic device provided in this application. In the scenario shown in FIG. 1, it is assumed that the first electronic device (the smartphone 110) used by the user has capabilities such as BT, Wi-Fi, NFC, USB, Zigbee, cellular, and the like. Wi-Fi may include two types of frequencies: 2.4 GHz and 5 GHz, which are respectively represented by Wi-Fi (2.4 GHz) and Wi-Fi (5 GHz). A second electronic device (the large-screen device 120) in the home has capabilities such as BT, Wi-Fi, USB, NFC, cellular, and the like. The smartphone 110 discovers the large-screen device 120 in an active discover manner. It is assumed that the smartphone 110 has already been connected to the large-screen device 120 by using the USB. In the scenario shown in FIG. 1, the smartphone may be understood as the discover device, and the large-screen device may be understood as the discoverable device or a scanning device.

Figure 6:
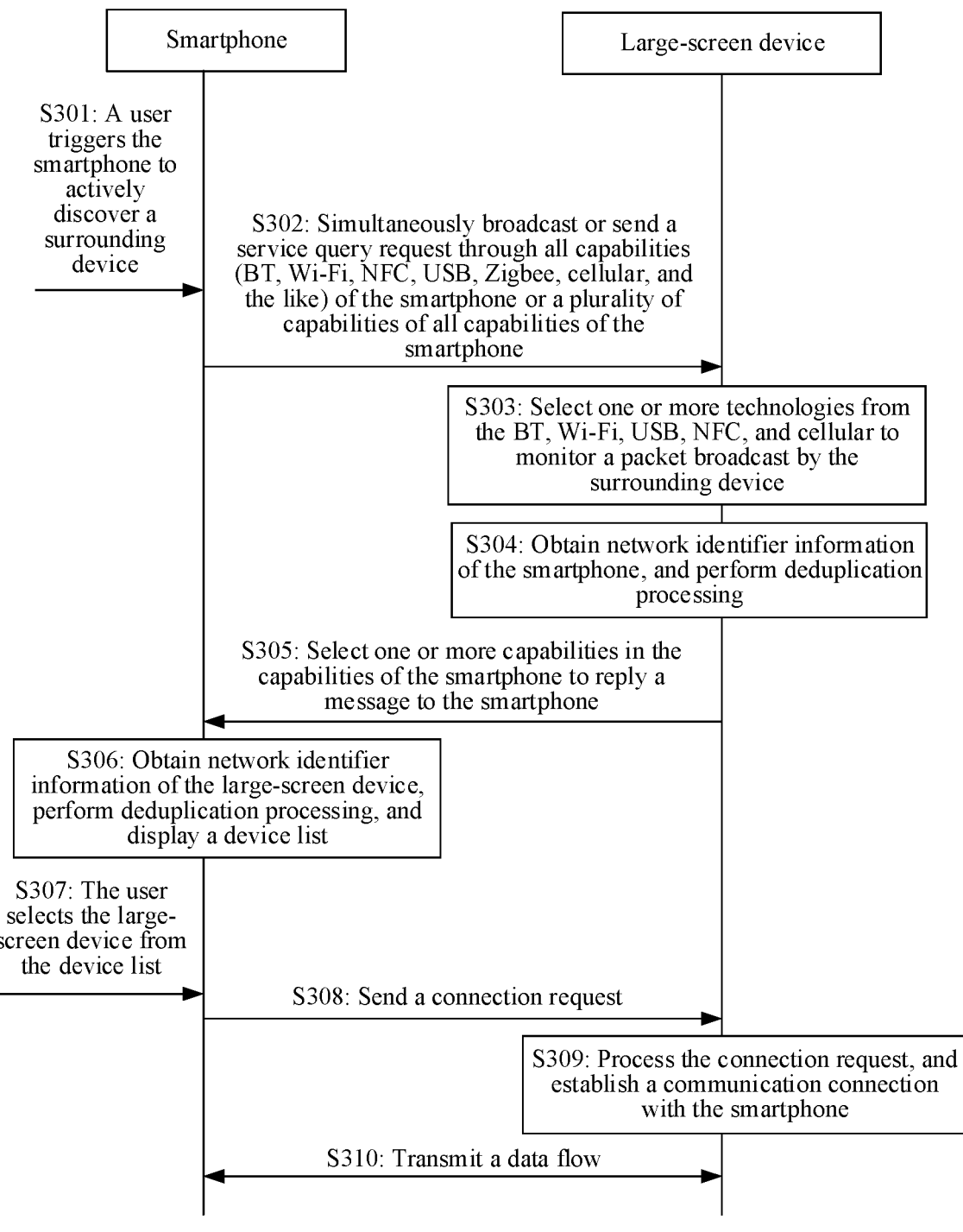
FIG. 6 is a schematic flowchart of an example of a method for discovering and connecting to an electronic device according to an embodiment of this application.

FIG. 6 is a schematic flowchart of an example of a method 300 for discovering and connecting to an electronic device in the scenario shown in FIG. 1 according to this application. As shown in FIG. 6, the method 300 includes: S301 to S310.

Figure 7A:
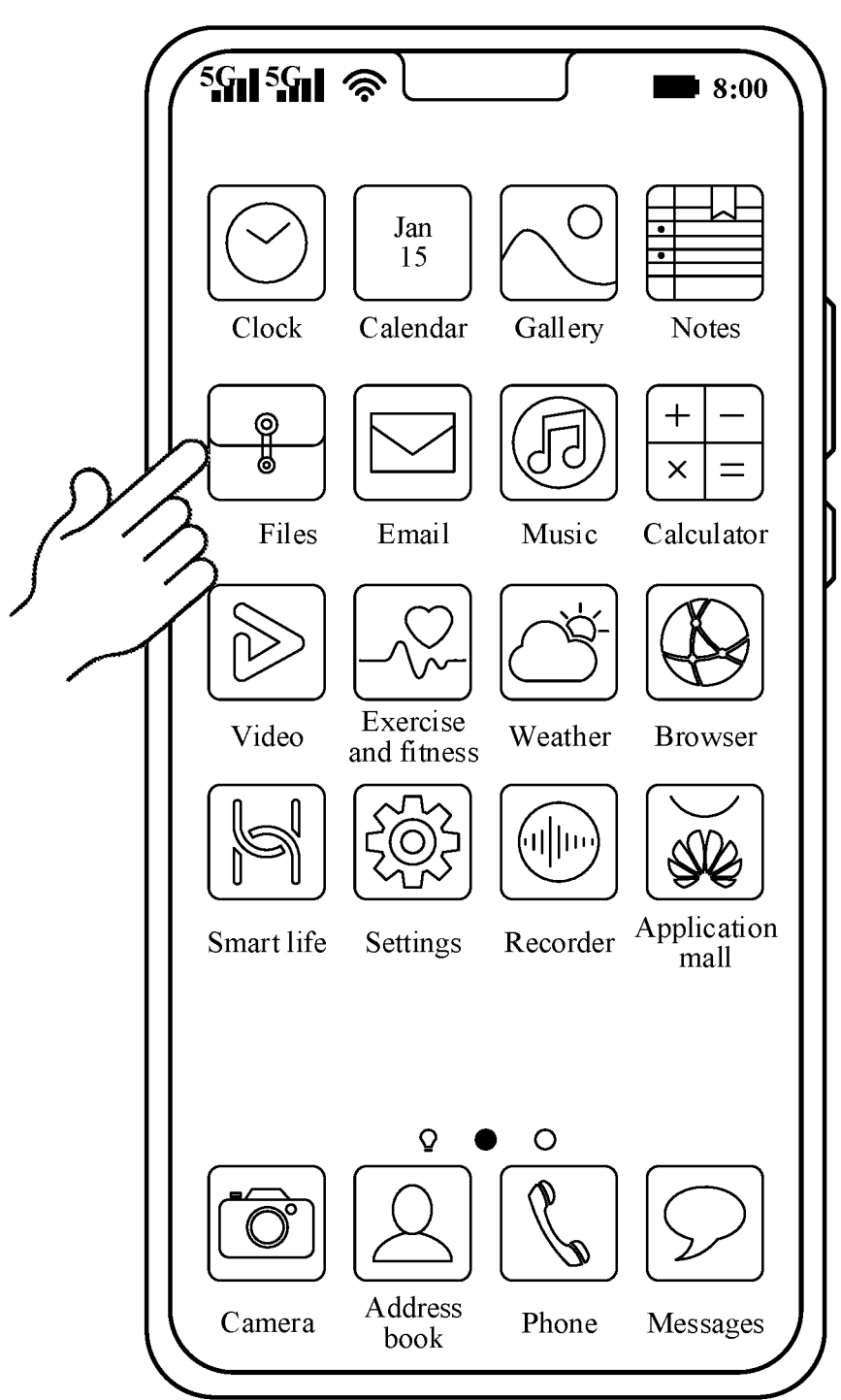
FIGS. 7A-7D are schematic diagrams of an example of a user interface on which a user triggers a smartphone to actively discover a surrounding device according to an embodiment of this application.
Figure 7B:
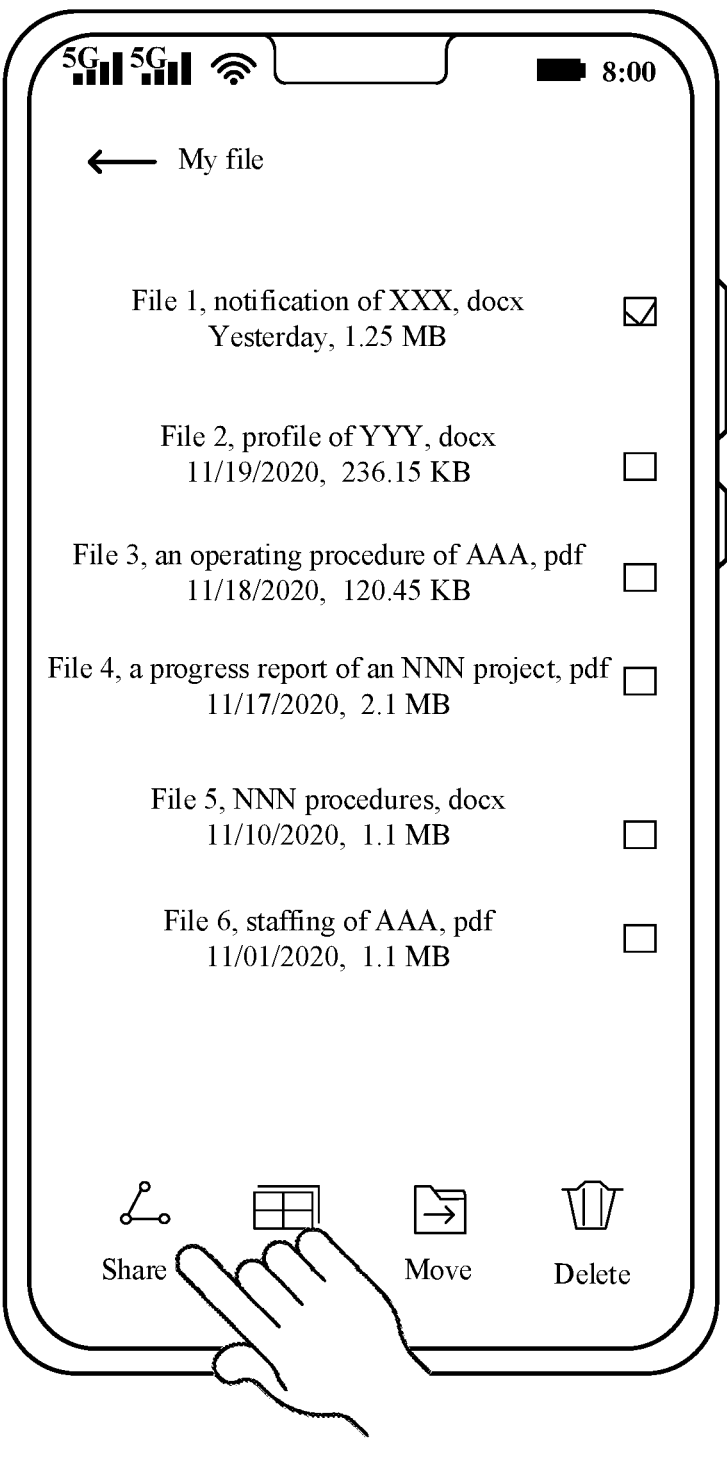

S301. A user triggers a smartphone to actively discover a surrounding device. In embodiments of this application, the user may trigger, in the following two operation manners, the smartphone to actively discover the surrounding device:

First operation manner: It is assumed that the user needs to transmit a file to the large-screen device by using the smartphone. As shown in a in FIG. 7A, the user starts a "Files" application on the smartphone, and a displayed interface is shown in b in FIG. 7B. The user selects a file (for example, a file 1) that needs to be shared, taps "share", and selects a sharing manner. A displayed interface is shown in c in FIG. 7C. In embodiments of this application, the user may tap a "select all" button, which means that the user simultaneously discovers another device by using manners such as Bluetooth, Wi-Fi, NFC, USB, Zigbee, and a mobile network. Optionally, the user may further select any plurality of manners from the manners such as Bluetooth, Wi-Fi, NFC, USB, Zigbee, and mobile network based on a requirement of the user. It is assumed that the smartphone is not connected to the large screen by using the USB, the user may tap a selection box under the several manners such as "Bluetooth", "Wi-Fi", "NFC", "Zigbee", and "mobile network", to select these discover manners to simultaneously discover another device. After the user taps the "select All" button, the smartphone discovers other surrounding devices by simultaneously using the Bluetooth, Wi-Fi, NFC, USB, ZigBee, and mobile network. After scanning surrounding devices, the smartphone displays a list of scanned devices to the user. The device list includes device identifiers of one or more devices. For example, the displayed device list may be shown in d in FIG. 7D. The user may select one device (for example, a large-screen device) from the device list as required. After the user selects the large-screen device, the smartphone and the large-screen device automatically select an optimal connection manner from connection manners supported by both devices based on a service that needs to be transmitted, a network environment, and the like, to perform file transmission.

Figure 8A:
FIGS. 8A-8D are schematic diagrams of another example of a user interface on which a user triggers a smartphone to actively discover a surrounding device according to an embodiment of this application.
Figure 8B:
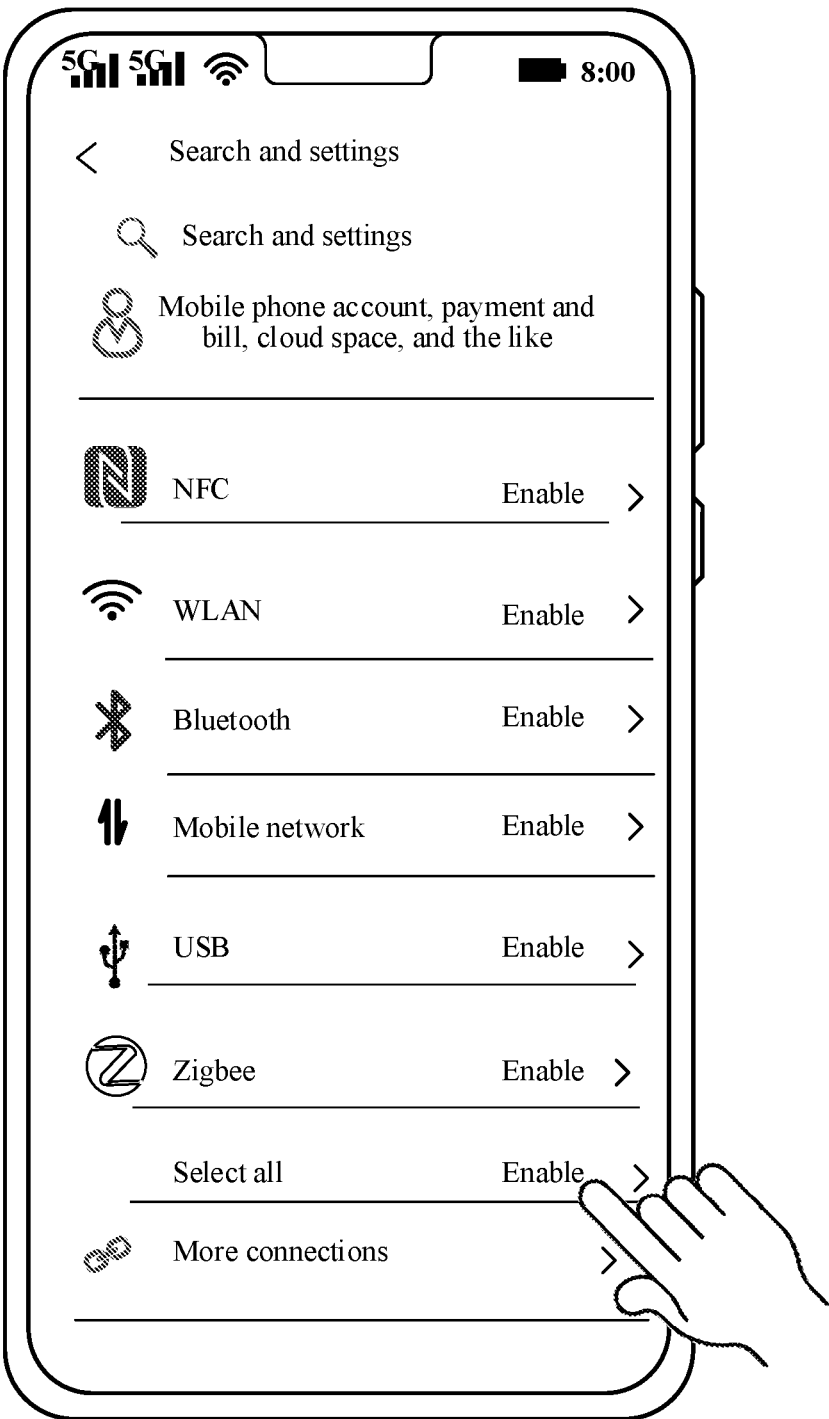

Second operation manner: It is assumed that a purpose of the user is merely to connect the smartphone to the large-screen device, to facilitate quick file transmission when data or a file is shared subsequently. The user taps "settings" on an interface shown in a in FIG. 8A, and a displayed interface is shown in b in FIG. 8B. In embodiments of this application, the user may tap a "select all" enabling button, which means that the user simultaneously discovers another device by using Bluetooth, Wi-Fi, NFC, USB, Zigbee, and a mobile network. Optionally, the user may further select any plurality of manners from the Bluetooth, Wi-Fi, NFC, USB, Zigbee, and mobile network based on a requirement of the user. For example, it is assumed that the smartphone is not connected to the large screen by using the USB, the user may tap an enabling button corresponding to "Bluetooth", "Wi-Fi", "NFC", "Zigbee", and "mobile network" respectively, to select these discover manners to discover another device. After the user taps the "select All" button, the smartphone discovers other surrounding devices by simultaneously using the Bluetooth, Wi-Fi, NFC, USB, ZigBee, and mobile network. After scanning surrounding devices, the smartphone displays a list of scanned devices to the user. The device list includes device identifiers of one or more devices. For example, the displayed device list may be shown in c in FIG. 8C. The user may select one device (for example, a large-screen device) from the device list as required. After the user selects the large-screen device, the smartphone and the large-screen device automatically select an optimal connection manner from connection manners supported by both devices based on a service that needs to be transmitted, a network environment, and the like, to connect the smartphone to the large screen.

Figure 8C:
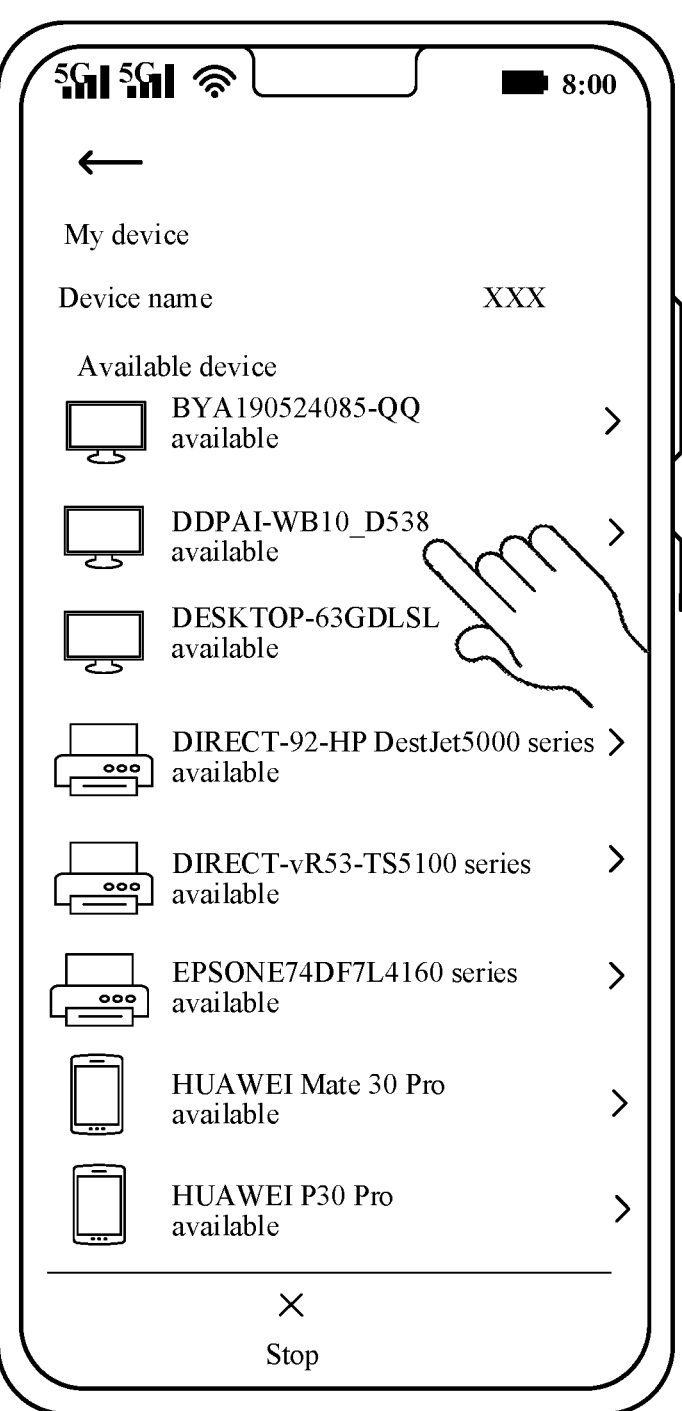
Figure 8D:
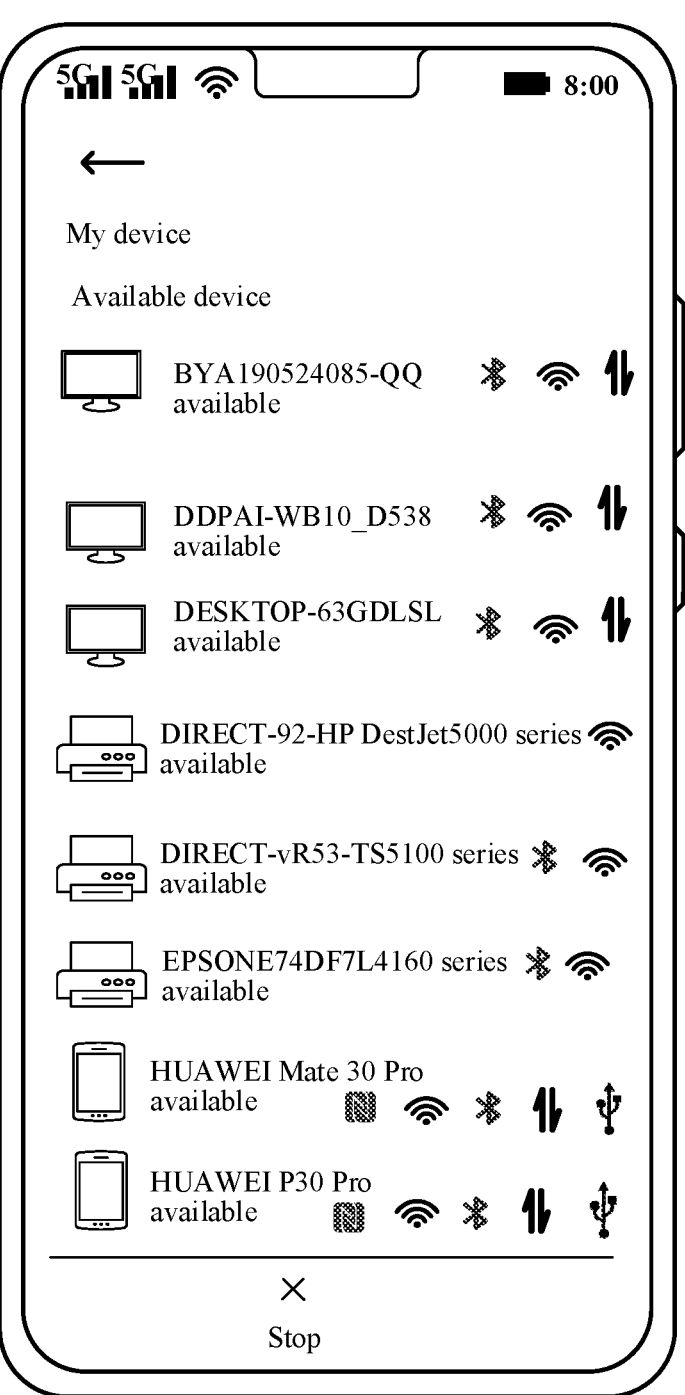

Optionally, in embodiments of this application, after the device list shown in c in FIG. 8C, as shown in d in FIG. 8D, the smartphone may further display, to the user, a connection technology or a connection capability supported by each device in the displayed device list. The connection technology or the connection capability supported by one device may be understood as one or more connection types supported by the device, and the user may view a connection technology supported by each device.

Figure 7C:
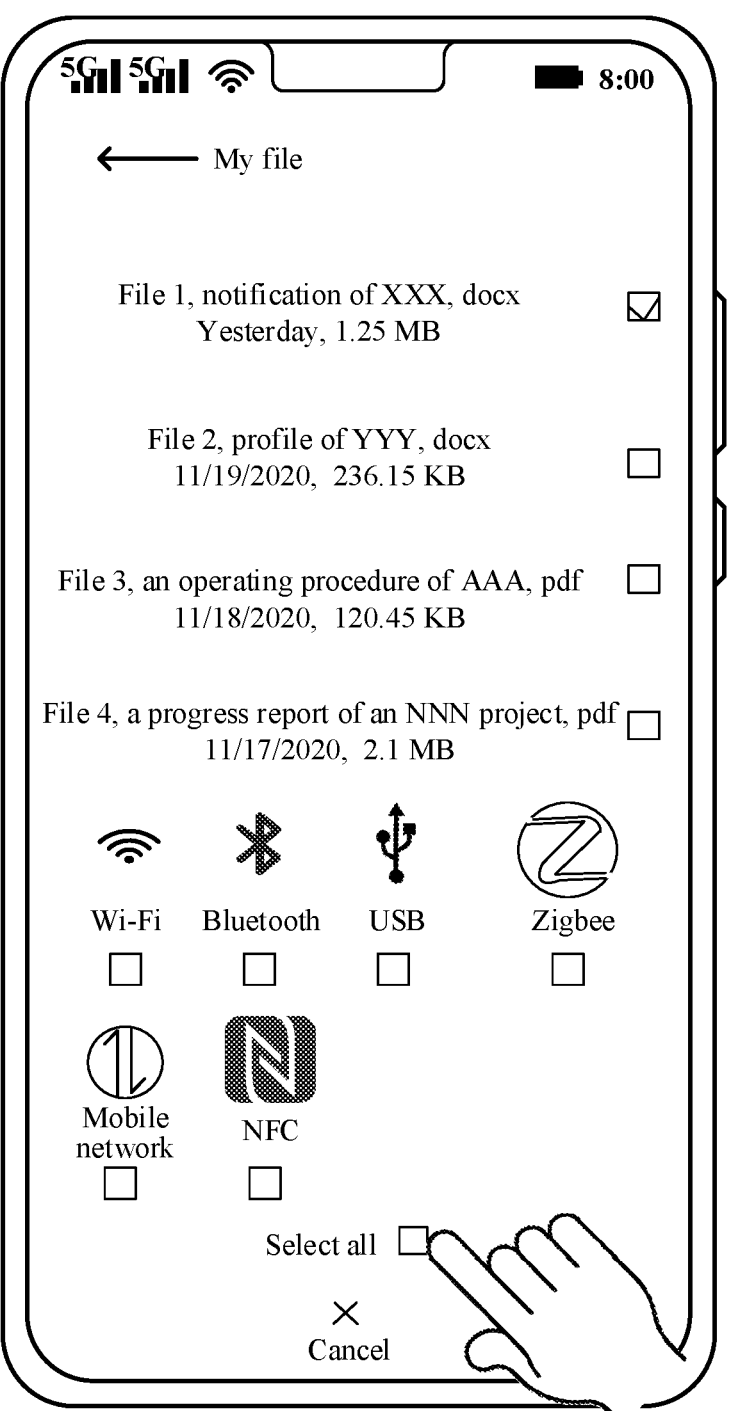
Figure 7D:
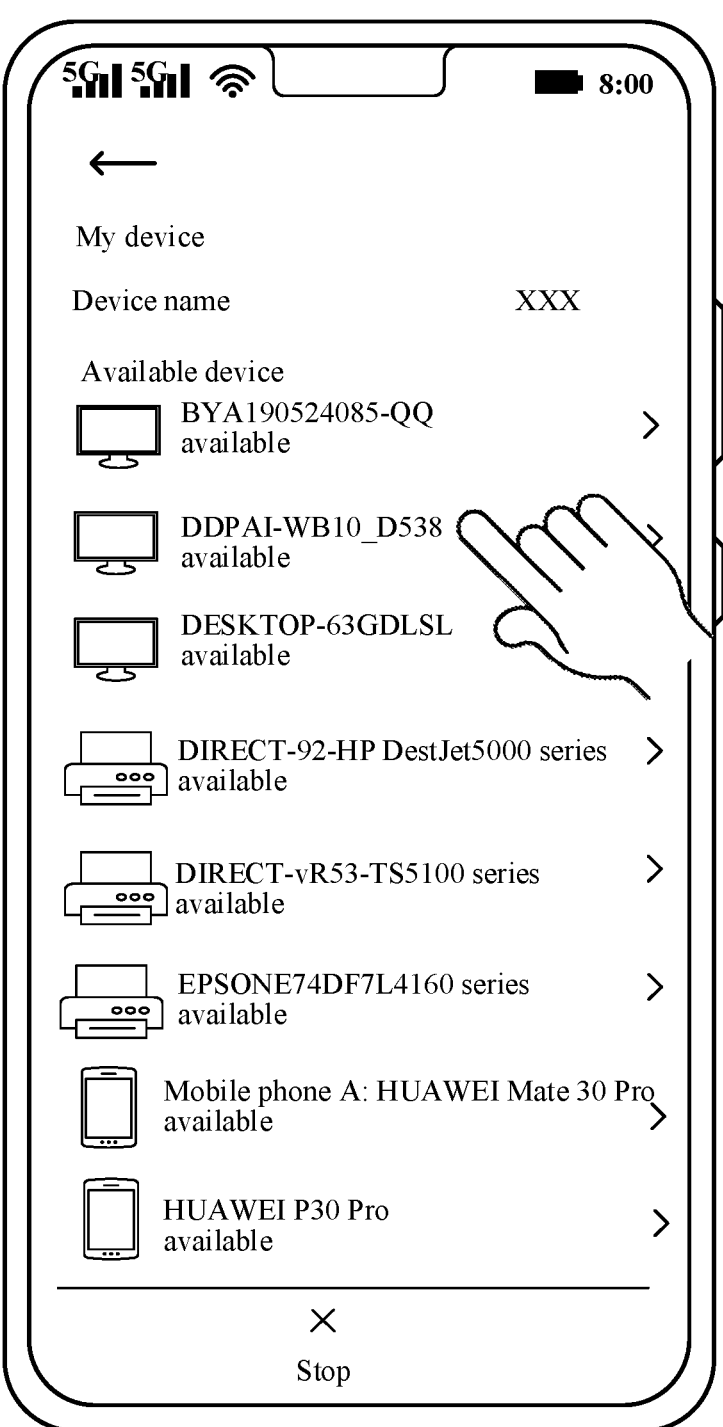

Optionally, in embodiments of this application, after the interface shown in c in FIG. 7C, the smartphone may also display the display interface shown in d in FIG. 8D. In other words, the interface shown in d in FIG. 7D may be replaced with the interface shown in d in FIG. 8D.

It should be understood that in embodiments of this application, in addition to the foregoing two operation manners, the user may further trigger, in another operation manner, the smartphone to actively discover the surrounding device. This is not limited in embodiments of this application.

In S302, after receiving an operation of triggering, by the user, the smartphone to actively discover a surrounding device, the smartphone simultaneously broadcasts or sends a packet through all capabilities (BT, Wi-Fi, NFC, USB, Zigbee, cellular, and the like) of the smartphone or a plurality of capabilities of all capabilities of the smartphone. In an example of this embodiment, for example, the smartphone simultaneously broadcasts or sends a service query request (which may also be referred to as broadcasting a packet) to a surrounding device by using several manners (capabilities) such as the BT, Wi-Fi, NFC, USB, Zigbee, and mobile network. In other words, the smartphone broadcasts one service query request (referred to as a first service query request for differentiation) to a surrounding device in a BT manner. The smartphone broadcasts one service query request (referred to as a second service query request for differentiation) to a surrounding device in a Wi-Fi manner, the smartphone sends one service query request (referred to as a third service query request for differentiation) to a surrounding device in a USB manner, the smartphone broadcasts one service query request (referred to as a fourth service query request for differentiation) to a surrounding device in an NFC manner, the smartphone broadcasts one service query request (referred to as a fifth service query request for differentiation) to a surrounding device in a Zigbee manner, and the smartphone broadcasts one service query request (referred to as a sixth service query request for differentiation) to a surrounding device through a mobile network (namely, a cellular network (cellular)). The six service query requests are simultaneously broadcast by the smartphone in a broadcast manner.

Optionally, in embodiments of this application, the six service query requests may be separately used to query a capability of the surrounding device, or used to query whether the surrounding device has several specific capabilities. Based on this, the six service query requests may be further separately used to query service information of the surrounding device, or used to query whether the surrounding device has several pieces of specific service information, or the like.

In embodiments of this application, the six business service query requests are simultaneously sent by the smartphone. In embodiments of this application, "simultaneously sending or simultaneously broadcasting" may be understood as that in a time length of one time window, the smartphone, in the time window, separately sends or broadcasts a service query request by simultaneously using a plurality of non-conflicting communication technologies (to be specific, time periods in which the service query request is separately sent or broadcast by using the plurality of non-conflicting communication technologies overlap in time domain, and may partially or completely overlap. For example, the plurality of non-conflicting communication technologies may separately and simultaneously start sending or broadcasting the service query request). Based on this, in the time window, the service query request is sent or broadcast by using another communication technology. If the other communication technology conflicts with a communication technology used to send or broadcast the service query request in the time window, the service query request is sent or broadcast in a time division manner in the time window by using a plurality of mutually conflicting communication technologies. In other words, "simultaneously sending" in embodiments of this application may be understood as: A smartphone needs to simultaneously or in a time division manner send or broadcast a service query request in a time granularity of one-time window by using a plurality of different communication technologies.

Alternatively, in embodiments of this application, "simultaneously sending or simultaneously broadcasting" may be understood as: sending or broadcasting the first service query request in the first time period by using the first communication technology, and sending or broadcasting the first service query request in the second time period by using the second communication technology. If the first communication technology does not conflict with the second communication technology (for example, a conflict does not exist on a channel, an air interface time sequence, or the like), the first time period and the second time period may overlap (which may be partially or completely overlapping) in time domain. Based on this, the third service query request is sent or broadcast in the third time period by using the third communication technology. If the third communication technology conflicts with the first communication technology or the second communication technology (for example, a conflict exists in a channel or an air interface time sequence), the third time period does not overlap with the first time period in time domain, or the third time period does not overlap with the second time period in time domain. In other words, "simultaneously sending" may be understood as: time periods in which service query requests are separately sent or broadcast by using a plurality of non-conflicting communication technologies overlap (partially or completely overlap) in time domain, and time periods in which service query requests are separately sent or broadcast by using mutually conflicting communication technologies do not overlap in time domain.

In embodiments of this application, the first service query request further includes Wi-Fi capability indication information, NFC capability indication information, USB capability indication information, ZigBee capability indication information, and mobile network capability indication information. The Wi-Fi capability indication information indicates that the smartphone further broadcasts the service query request in a Wi-Fi manner. The NFC capability indication information indicates that the smartphone further broadcasts the service query request in an NFC manner. The USB capability indication information indicates that the smartphone further sends the service query request in a USB manner. The ZigBee capability indication information indicates that the smartphone further broadcasts the service query request in a ZigBee manner. The mobile network capability indication information indicates that the smartphone further broadcasts the service query request in a cellular network manner.

Optionally, the first service query request further includes BT capability indication information. The BT capability indication information indicates that the smartphone further broadcasts the service query request in a BT manner.

Similarly, the second service query request to the second service query request respectively carry indication information that indicates that the smartphone further broadcasts or sends the service query request by using another capability of the smartphone.

In other words, the service query requests broadcast in different manners respectively carry indication information that indicates that the smartphone simultaneously broadcasts or sends the service query request by simultaneously using all other capabilities of the smartphone.

Optionally, in embodiments of this application, in another possible implementation, the BT capability indication information may further indicate that the smartphone further has the BT communication capability, the Wi-Fi capability indication information may further indicate that the smartphone further has the Wi-Fi communication capability, and the NFC capability indication information may further indicate that the smartphone further has the NFC communication capability. The USB capability indication information may further indicate that the smartphone further has the USB communication capability. The Zigbee capability indication information may further indicate that the smartphone further has the Zigbee communication capability. In other words, the various pieces of capability indication information may further indicate that the smartphone has a communication capability, which does not mean that the smartphone sends or broadcasts a service query request by using the communication capability.

Optionally, in embodiments of this application, for example, if the smartphone of the user supports the Bluetooth communication capability, but the user disables "Bluetooth" on the smartphone, in this case, the smartphone cannot broadcast the service query request in a Bluetooth manner. However, the service query request broadcast or sent by using another communication technology may carry Bluetooth capability indication information. The Bluetooth capability indication information indicates that the smartphone has the Bluetooth communication capability. Alternatively, the service query request broadcast or sent by using another communication technology may not carry the Bluetooth capability indication information. In other words, a peer device does not learn whether the smartphone supports the Bluetooth communication capability.

Optionally, in embodiments of this application, in addition to the manner in which other capability indication information is separately carried in the foregoing six service query requests, the large-screen device is notified that the smartphone further broadcasts or sends the service query request to the large-screen device by using the other capability, or the smartphone has another communication capability, and another optional manner may be further used.

For example, in a possible implementation, a rule is negotiated in advance between the smartphone and the large-screen device. For example, one field (for example, an indication field) may be set in each query request, and the field indicates whether the smartphone broadcasts the service query request to the large-screen device by using another capability, or whether the smartphone has another communication capability. For example, the field length is 6 bits (bits). A location of the field in each query request is fixed (for example, the field is located in the nth field in each service query request). Both the smartphone and the large-screen device learn in advance the location of the field and meaning represented by each bit in the field.

For example, in the 6-bit field, the first bit indicates whether the smartphone broadcasts the service query request in a BT manner, where a value of a bit is 1, representing that the smartphone broadcasts the service query request in the BT manner, and a value of a bit is 0, representing that the smartphone does not broadcast the service query request in the BT manner. Similarly, the second bit indicates whether the smartphone broadcasts the service query request in a Wi-Fi manner, where a value of the bit is 1, representing that the smartphone broadcasts the service query request in the Wi-Fi manner, and a value of the bit is 0, representing that the smartphone does not broadcast the service query request in the Wi-Fi manner. The third bit indicates whether the smartphone broadcasts the service query request in an NFC manner, where a value of a bit is 1, representing that the smartphone broadcasts the service query request in the NFC manner, and a value of a bit is 0, representing that the smartphone does not broadcast the service query request in the NFC manner. The fourth bit indicates whether the smartphone sends the service query request in a USB manner, where a value of the bit is 1, representing that the smartphone sends the service query request in the USB manner, and a value of the bit is 0, representing that the smartphone does not send the service query request in the USB manner. The fifth bit indicates whether the smartphone broadcasts the service query request in a Zigbee manner, where a value of the bit is 1, representing that the smartphone broadcasts the service query request in the Zigbee manner, and a value of the bit is 0, representing that the smartphone does not broadcast the service query request in the Zigbee manner. The sixth bit indicates whether the smartphone broadcasts the service query request in a cellular manner, where a value of the bit is 1, representing that the smartphone broadcasts the service query request in the cellular manner, and a value of the bit is 0, representing that the smartphone does not broadcast the service query request in the cellular manner. The smartphone and the large-screen device negotiate an indication rule of the field in advance. In this way, the indication field is used, and the following may be implemented: indicating whether the smartphone simultaneously broadcasts the service query request by using another capability of the smartphone.

For another example, in another possible implementation, the smartphone and the large-screen device may negotiate one rule in advance: Different capabilities are respectively represented by using different special character strings (for example, one special character string may be one specific sequence, and the sequence may include at least one of a gies. Therefore, when the smartphone simultaneously broadcasts a packet by using manners such as BT, Wi-Fi, NFC, USB, Zigbee, cellular, or the like, a conflict avoidance mechanism described below may be used.

TABLE 1

Conflict table when different technologies are used to simultaneously broadcast packets

| Different discover technologies | USB | NFC | BLE | Wi-Fi (2.4 GHz) | Wi-Fi (5 GHz) | Zigbee | cellular |
|---|---|---|---|---|---|---|---|
| USB | — | Not conflict | Not conflict | Not conflict | Not conflict | Not conflict | Not conflict |
| NFC | Not conflict | — | Not conflict | Not conflict | Not conflict | Not conflict | Not conflict |
| BLE | Not conflict | Not conflict | — | Conflict | Not conflict | Conflict | Not conflict |
| Wi-Fi (2.4 GHz) | Not conflict | Not conflict | Conflict | — | Not conflict | Conflict | Not conflict |
| Wi-Fi (5 GHz) | Not conflict | Not conflict | Not conflict | Not conflict | — | Not conflict | Conflict |
| Zigbee | Not conflict | Not conflict | Conflict | Conflict | Not conflict | — | Not conflict |
| cellular | Not conflict | Not conflict | Not conflict | Not conflict | Conflict | Not conflict | — | digit, a letter, or a special character), and these different special character strings may or may not exist in each query request. For example, there may be six different special character strings, and the six different special character strings respectively represent capabilities such as BT, Wi-Fi, NFC, USB, Zigbee, and cellular. If a special character string exists in a query request, it represents that the smartphone further broadcasts the service query request to the large-screen device by using a capability corresponding to the special character string, or the smartphone further has a communication capability corresponding to the special character string. If the special character string does not exist, it represents that the smartphone does not broadcast the service query request to the large-screen device by using the capability corresponding to the special character string, or the smartphone does not have the communication capability corresponding to the special character string. The smartphone and the large-screen device negotiate indication rules of different special character strings in advance. In this way, these different special character strings are used, and the following may be implemented: indicating whether the smartphone broadcasts the service query request by using another capability of the smartphone, or whether the smartphone further has another communication capability.

In embodiments of this application, each of the foregoing six service query requests further carries one random value (which may also be referred to as a random code), the random values respectively carried in the six service query requests are the same, and the random values are randomly generated by the smartphone. It should be understood that the smartphone may generate different random values at different time points. The random value uniquely identifies the smartphone, to be specific, the random value uniquely identifies one device. Random values carried in a plurality of service query requests sent at the same time are the same, and random values carried in service query requests sent at different times are different.

It should be understood that in embodiments of this application, when the smartphone simultaneously broadcasts or sends a packet through all capabilities (BT, Wi-Fi, NFC, USB, Zigbee, cellular, and the like) of the smartphone, because different capabilities or technologies have various corresponding protocol specifications, a conflict problem of a channel, an air interface time sequence, and the like may exist when the packet is broadcast by using a plurality of different technologies. In other words, interference may exist between packets broadcast by using different technolo- Table 1 shows a conflict situation when different technologies are used to simultaneously broadcast packets. As shown in Table 1, "conflict" in Table 1 represents that signal interference (for example, channel interference, a conflict on an air interface time sequence, or the like exists) exists when two different technologies are used to simultaneously broadcast packets, and the packet needs to be broadcast by using the two technologies in a time division strategy manner. "No conflict" represents that the signal interference does not exist when two technologies are used to simultaneously broadcast packets, so that the two technologies may be simultaneously used to broadcast packets.

Specifically, because there is no signal interference between the USB and the NFC and the BT (using the BLE as an example for description) and the Wi-Fi respectively, the USB and the NFC may be always enabled to monitor and scan. In other words, no matter whether the smartphone broadcasts the service query request by using another technology, the USB and the NFC may be simultaneously used to separately send and broadcast the service query request. However, 2.4 GHz interference exists between the BLE and the Wi-Fi. Therefore, when the BLE and the Wi-Fi (2.4 GHz) are used for performing broadcast, a time division strategy is used to avoid an air interface conflict, and broadcast is performed on a negotiated specified channel.

It should be understood that in embodiments of this application, the time division strategy relates to chip-level control of a specific channel. Specifically, a parallel discover manner is used on two or more non-conflicting technologies. In other words, a plurality of non-conflicting technologies are used to simultaneously broadcast a discover device packet, and a time division strategy is used on two or more mutually conflicting technologies or channels. In other words, a discover device packet is broadcast in a time division manner on two or more mutually conflicting technologies or channels.

In embodiments of this application, the time division strategy first synchronizes clock strategies of a plurality of chips of the smartphone and the large-screen device, and plans a broadcast window of the plurality of chips of the smartphone and a scanning window strategy of the plurality of chips of the large-screen device according to the synchronized clock strategy, where a time length of the broadcast window is less than a time length of a scanning window. The discover device (smartphone) and the discoverable device (large-screen device) exchange data packets in the broadcast window and the scanning window respectively, to simultaneously discover other devices by using a plurality of technologies.

Figure 9:
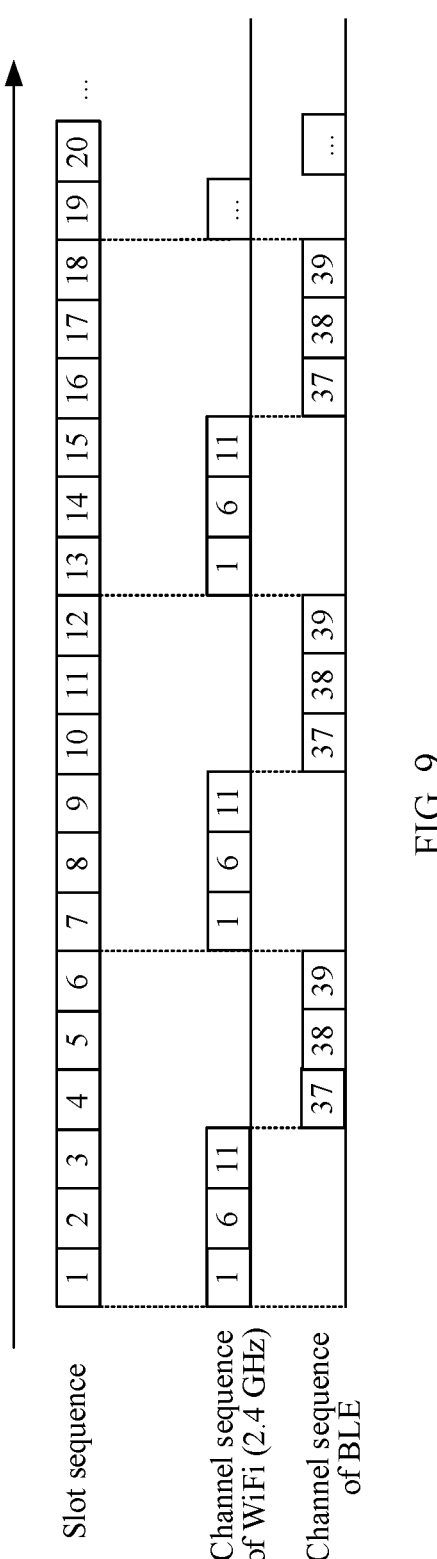
FIG. 9 is a schematic diagram of an example in which BLE and Wi-Fi (2.4 gigahertz (GHz)) broadcast service query requests in different slots according to an embodiment of this application.

The following describes a time division strategy by using BLE and Wi-Fi (2.4 GHz) as an example when the smartphone broadcasts a service query request by using the BLE and the Wi-Fi (2.4 GHz) respectively. FIG. 9 is a schematic diagram of an example in which BLE and Wi-Fi (2.4 GHz) broadcast service query requests in different slots. As shown in FIG. 9, each small block in the first row represents one slot (slot), and a number in the small block represents a number of the slot. For a smartphone, each slot shown in FIG. 9 may be referred to as a broadcast slot. For example, a time length of each slot may be 1 milliseconds (ms) or 0.5 ms, a second row represents a channel (channel) of the Wi-Fi (2.4 GHz), a small box in the second row represents one channel of the Wi-Fi (2.4 GHz), and a number in the small box represents a channel sequence (Channel Sequence). One small box in a third row represents one channel of the BLE, and the number in the small box represents the channel sequence of the BLE. For the Wi-Fi (2.4 GHz) technology, the first channel, a sixth channel, and an eleventh channel are broadcast channels. For the BLE technology, a $37^{th}$ channel, a $38^{th}$ channel, and a $39^{th}$ channel are broadcast channels.

As shown in FIG. 9, in each slot, data may be sent only on a fixed channel of a technology (or capability). For example, in a first slot, a service query request is broadcast on the first channel of the Wi-Fi 2.4 GHz, in a second slot, a service query request is broadcast on the sixth channel of the Wi-Fi 2.4 GHz, and in a third slot, a service query request is broadcast on the eleventh channel of the Wi-Fi 2.4 GHz. In the fourth slot, the service query request is broadcast on the $37^{th}$ channel of the BLE, in the fifth slot, the service query request is broadcast on the $38^{th}$ channel of the BLE, and in the sixth slot, the service query request is broadcast on the $39^{th}$ channel of the BLE. In other words, when the smartphone broadcasts the service query request by simultaneously using the BLE and the Wi-Fi (2.4 GHz), the service query request is broadcast on different channels by using only the Wi-Fi (2.4 GHz) technology in the first slot to the third slot, and the service query request is broadcast on different channels by using only the BLE technology in the fourth slot to the sixth slot, so that a packet is broadcast by using the BLE and the Wi-Fi (2.4 GHz) in a time division manner, and a problem of an air interface conflict on the same frequency when the smartphone broadcasts the service query request by simultaneously using the BLE and the Wi-Fi (2.4 GHz) is resolved.

In Table 1, if a conflict exists when the service query request is broadcast by simultaneously using any two technologies, a manner similar to the manner shown in FIG. 9 may also be used to broadcast the service query request in a time division manner, to resolve a problem of an air interface conflict that exists between different technologies.

In embodiments of this application, if the foregoing six service query requests are used to query whether the surrounding device has several capabilities or services, the foregoing six service query requests respectively carry: a name of a target device, a type of a target device, and a target capability or a target service that a target device needs to support. The target service may include a service name, a service ID, a service attribute, and the like of a target service. For example, the foregoing six service query requests respectively carry: whether having capabilities such as BT, Wi-Fi, USB, NFC, or cellular, and/or whether having services such as a file sharing service, a printing service, a projection service, and the like.

Optionally, the foregoing six service query requests may further carry: capability information of the smartphone (for example, including a name of the smartphone, a device type of the smartphone, a capability or a service capability of the smartphone, and the like). If the foregoing six service query requests do not carry the capability information of the smartphone, after the six service query requests, the smartphone and the large-screen device need to perform additional broadcast packet interaction, so that the large-screen device obtains the capability information of the smartphone. Alternatively, the capability information of the smartphone is exchanged in a connection process between the smartphone and the large-screen device.

It should be understood that in embodiments of this application, the foregoing six service query requests may be sent for a plurality of times. For example, the foregoing six service query requests are sent at a first moment, and at a moment after the first moment, the smartphone may repeatedly send the foregoing six service query requests or any plurality of the foregoing six service query requests. Optionally, the smartphone may periodically send the foregoing six service query requests.

In S303, the large-screen device selects, based on a condition of the large-screen device, one or more technologies from BT, Wi-Fi, USB, NFC, and cellular to monitor (or may be referred to as scan) a packet broadcast by a surrounding device. For example, the large-screen device may select, based on a capability supported by the large-screen device, a delay requirement, power consumption, and the like, one or more capabilities (in BT, Wi-Fi, USB, NFC, and cellular) from capabilities supported by the large-screen device to perform monitoring.

In S303, because the large-screen device selects one or more technologies from BT, Wi-Fi, USB, NFC, and cellular to simultaneously monitor (scan) a packet broadcast by a surrounding device, a conflict problem of different technologies on a channel, an air interface time sequence, and the like also exists. For example, when the large-screen device simultaneously performs scanning or monitoring by using the BLE and the Wi-Fi (2.4 GHz), the large-screen device may reuse an existing scanning technology, and simultaneously perform scanning on the Wi-Fi (2.4 GHz) and the BLE chip, or may perform scanning by using different technologies according to the time-division strategy described in S302, to be specific, perform scanning by using different technologies in different slots by using the slot relationship shown in FIGS. 7A-7D.

For the large-screen device, each slot shown in FIG. 9 may be referred to as a scanning slot. For example, in the first slot, Wi-Fi scanning is performed on the first channel of the Wi-Fi 2.4 GHz, in the second slot, Wi-Fi scanning is performed on the sixth channel of the Wi-Fi 2.4 GHz, and in the third slot, Wi-Fi scanning is performed on the eleventh channel of the Wi-Fi 2.4 GHz. In the fourth slot, BLE scanning is performed on the $37^{th}$ channel of the BLE. In the fifth slot, BLE scanning is performed on the $38^{th}$ channel of the BLE. In the sixth slot, BLE scanning is performed on the $39^{th}$ channel of the BLE. In other words, when the large-screen device performs scanning by simultaneously using the BLE and the Wi-Fi (2.4 GHz), BLE scanning is performed in the first slot to the third slot, Wi-Fi scanning is performed by only using the Wi-Fi (2.4 GHz), and BLE scanning is performed by only using the BLE in the fourth slot to the sixth slot, so that scanning of the BLE and the Wi-Fi (2.4 GHz) is implemented in a time division manner, and a problem of an air interface conflict when the large-screen device performs scanning by simultaneously using the BLE and the Wi-Fi (2.4 GHz) is resolved.

Optionally, in embodiments of this application, when the large-screen device performs scanning in the foregoing slot sequence, scanning may be performed in two phases, namely, a coarse matching phase and an exact matching phase.

Coarse matching phase: When the large-screen device (the discoverable device) performs scanning, if slot synchronization is not performed with any discover device, to make it easier for the large-screen device to scan the service query request broadcast by the smartphone, a time length of a scanning slot of the large-screen device needs to be twice or more than twice a length of a broadcast slot of the smartphone.

Exact matching phase: After scanning the service query request broadcast by the smartphone, the large-screen device performs slot synchronization with the smartphone. In this case, a length of the scanning slot of the large-screen device may be the same as the length of the scanning slot of the smartphone.

For example, in embodiments of this application, the time length of the broadcast slot of the smartphone may be 1 ms, and the time length of the scanning slot of the large-screen device may be 2 ms. In this way, a large-screen device used as a scanning device may more easily discover more broadcast devices. After the large-screen device completes slot synchronization with the smartphone, the time length of the scanning slot of the large-screen device may be reduced from 2 ms to 1 ms. In this way, the time length of the scanning slot of the large-screen device is consistent with the length of the broadcast slot of the smartphone. It is convenient for the broadcast device (namely, the smartphone) to perform data exchange with the scanning device (namely, the large-screen device).

In S304, after the large-screen device monitors or scans all or a part of the six service query requests broadcast by the smartphone, it is assumed that the large-screen device monitors the first service query request, the second service query request, the third service query request, the fourth service query request, and the sixth service query request. The large-screen device determines, based on the first service query request, a MAC address corresponding to the BT of the smartphone, which is referred to as a BT MAC address for short below. The large-screen device determines, based on the second service query request, a MAC address corresponding to the Wi-Fi of the smartphone, which is referred to as a Wi-Fi MAC address for short below. The large-screen device determines, based on the third service query request, a MAC address corresponding to the USB of the smartphone, which is referred to as a USB MAC address for short below. The large-screen device determines, based on the fourth service query request, a MAC address corresponding to the NFC of the smartphone, which is referred to as an NFC MAC address for short below. The large-screen device determines, based on the sixth service query request, a MAC address corresponding to the cellular network of the smartphone, which is referred to as a MAC address of the cellular network for short below. The MAC address of the cellular network may be understood as a smartphone IP address. In addition, the large-screen device determines, based on random values respectively carried in the first service query request, the second service query request, the third service query request, the fourth service query request, and the sixth service query request, that the first service query request, the second service query request, the third service query request, the fourth service query request, and the sixth service query request are all from a same device. The large-screen device may obtain the network identifier information of the smartphone based on the information. The network identifier information includes: BT MAC, Wi-Fi MAC, USB MAC, NFC MAC, and IP. In other words, the network identifier information includes five parameters of the smartphone, where the five parameters are respectively: a BT MAC address of the smartphone, a Wi-Fi MAC address of the smartphone, a USB MAC address of the smartphone, an NFC MAC address of the smartphone, and an IP address of the smartphone. The network identifier information uniquely identifies the smartphone.

It should be understood that in embodiments of this application, the network identifier information of the electronic device is one set or a combination including a plurality of addresses of the electronic device. One address (for example, the BT MAC address) of the electronic device is one element in the network identifier information. The network identifier information may include a plurality of elements. In addition, a quantity of elements included in the network identifier information is extensible, to be specific, may be dynamically changeable. For example, the network identifier information of the first electronic device may include four elements, which are respectively a BT MAC address, a Wi-Fi MAC address, a USB MAC address, and an IP address. Alternatively, the network identifier information of the first electronic device may also include five elements, which are respectively a BT MAC address, a Wi-Fi MAC address, a USB MAC address, an NFC MAC address, and an IP address.

Optionally, in embodiments of this application, the network identifier information of the electronic device may be represented in a set or combination manner.

It should be understood that in embodiments of this application, in another possible implementation, the first service query request to the fifth service query request may further carry the IP address of the smartphone. In this case, the large-screen device may also obtain the IP address of the smartphone. Alternatively, if the first service query request to the fifth service query request do not carry the IP address of the large-screen device, after the large-screen device receives the first service query request to the fifth service query request, the large-screen device may further send a broadcast packet to the smartphone to query the IP address and other capability information of the smartphone, to obtain the IP address of the smartphone.

In a process in which the large-screen device discovers another device at the same time, because the smartphone repeatedly sends a service query request, when the smartphone sends one or more of the foregoing six service query requests next time, because the large-screen device has obtained and stored the network identifier information of the smartphone, when the large-screen device receives one or more service query requests sent by the smartphone next time, if the one or more service query requests carry a same random value, the large-screen device may determine, based on a same random value separately carried in the received plurality of service query requests, that the plurality of service query requests are from a same device (for example, referred to as a first device). Further, the large-screen device compares, based on the information, addresses separately carried in different service query requests in the plurality of service query requests, for example, a plurality of the BT MAC address, the Wi-Fi MAC address, the USB MAC address, the NFC MAC address, or the IP address with previously stored network identifier information of the smartphone (for example, in a manner of calculating a distance of data through a vector), and may determine that the first device and the smartphone are a same device, to be specific, perform deduplication processing on the device, to filter out repeated information. The device is identified by using the network identifier information of the device. The network identifier information of the device may be changeable, and may be dynamically extended and updated based on a change of a capability supported by the device. Therefore, the network identifier information of the device may be dynamically extended. The network identifier information of the device identifies a device, which may effectively prevent ID information of the device from being traced, resolve a problem in a conventional technology when a unique ID of the device identifies a device, the ID is prone to be traced, and improve security of the device.

Alternatively, as another possible implementation, in a process in which the large-screen device discovers another device at the same time, because the smartphone repeatedly sends a service query request, when the smartphone sends one or more service query requests next time, because the large-screen device has obtained and stored the network identifier information of the smartphone, when the large-screen device receives one or more service query requests sent by the smartphone next time, if the one or more service query requests do not carry a random value, the large-screen device compares, based on the address information, the addresses separately carried in the one or more service query requests, for example, one or more of a BT MAC address, a Wi-Fi MAC address, a USB MAC address, an NFC MAC address, or an IP address with previously stored network identifier information of the smartphone, and may also determine that the one or more service query requests are also from the smartphone, to be specific, perform deduplication processing on the device, to filter out repeated information.

It should be understood that in embodiments of this application, in different device discovery processes of the large-screen device, for example, the large-screen device performs device discovery every five minutes, and deduplication processing also needs to be performed on a device discovered previous time and a device discovered next time, and broadcast content of a same device is identified as a same device. A manner of the deduplication processing is the same as a manner of the foregoing process. For brevity, details are not described herein again.

In embodiments of this application, when the large-screen device receives a plurality of service query requests and identifies that the plurality of service query requests are from a same smartphone, the large-screen device may share information carried in the plurality of service query requests. For example, in a same device discovery process, it is assumed that after the large-screen device simultaneously receives the service query requests broadcast by the smartphone in the BT manner and the Wi-Fi manner respectively, because the service query request broadcast in the BT manner and the service query request broadcast in the Wi-Fi manner carry different data amounts, the service query request broadcast in the Wi-Fi manner carries a large data amount, and the service query request broadcast in the BT manner carries a small data amount. After the large-screen device receives the service query request broadcast by the smartphone in the Wi-Fi manner, filtering and deduplication processing may be performed on the information carried in the service query request broadcast in the Wi-Fi manner, so that interaction between the smartphone and the large-screen device in the BT manner may be avoided for a plurality of times. This reduces signaling overheads and improves resource utilization.

For another example, in different device discovery processes: If a device scanned by the large-screen device next time and a device scanned by the large-screen device previous time are matched by a grid identifier of the device, and the devices that are matched are the same device, the device scanned by the large-screen device next time may share the device capability or the service information scanned by the large-screen device before. The large-screen device only needs to synchronize some device capabilities or service information. In this way, the device capability and the service information need to be completely synchronized. This reduces signaling overheads and improves resource utilization.

In S305, after monitoring all or a part of the six service query requests broadcast by the smartphone, the large-screen device may select one or more capabilities of the large-screen device to reply a message to the smartphone (to be specific, reply response information to the smartphone). For example, the large-screen device performs selection based on a device capability of the large-screen device and a requirement of a scenario. Because the large-screen device is an always-on device, Wi-Fi and BLE of the large-screen device may be always on. After receiving a plurality of service query requests broadcast by the smartphone, the large-screen device may select a Wi-Fi manner or a BLE manner to simultaneously reply to the smartphone with a broadcast packet. For another example, the large-screen device may further select, based on power consumption of different capabilities, delays of different capabilities, and the like, capabilities such as the BLE and the Wi-Fi from capabilities such as BT (BLE), Wi-Fi, USB, NFC, cellular, and the like, to be specific, reply a message to the smartphone in both the BLE manner and the Wi-Fi manner.

It is assumed that the large-screen device finally selects the Wi-Fi manner or the BLE manner to reply a message to the smartphone.

The first message replied to the smartphone in a broadcast manner in the BLE manner includes Wi-Fi capability indication information, USB capability indication information, NFC capability indication information, cellular capability indication information, and one random value (or may also be referred to as a random code). The Wi-Fi capability indication information is used when the large-screen device has or does not have a Wi-Fi communication capability. The USB capability indication information indicates that the large-screen device has or does not have a USB communication capability, the NFC capability indication information indicates that the large-screen device has or does not have an NFC communication capability, and the cellular capability indication information indicates that the large-screen device has or does not have a cellular network communication capability. The random value is generated by the large-screen device and uniquely identifies the large-screen device. The random value uniquely identifies one device. The random value is randomly generated by the large-screen device. It should be understood that the large-screen device may generate different random values at different time points. The random value uniquely identifies the large-screen device. The random values carried in a plurality of pieces of information sent by the large-screen device at the same time are the same, and the random values carried in the information sent by the large-screen device at different times are different.

Optionally, the first message may further include BLE capability indication information. The BLE capability indication information indicates that the large-screen device further has a BLE communication capability. Alternatively, the first message may also not include the BLE capability indication information.

In a Wi-Fi manner, the second message replied to the smartphone in a broadcast manner includes BT capability indication information, USB capability indication information, NFC capability indication information, cellular capability indication information, and one random value (or may also be referred to as a random code). The BT capability indication information indicates that the large-screen device has or does not have a BT communication capability. A function of other capability indication information is the same as a function of the first message. A random value in the second message is generated by the large-screen device and uniquely identifies the large-screen device. The random value is the same as the random value in the first message.

Optionally, the second message may further include Wi-Fi capability indication information. The Wi-Fi capability indication information indicates that the large-screen device further has a Wi-Fi communication capability. Alternatively, the first message may also not include Wi-Fi capability indication information.

Optionally, in embodiments of this application, in addition to the manner in which the first message and the second message separately carry other capability indication information, the smartphone may be notified that the large-screen device further has the other capability, or another optional manner may be used.

For example, in a possible implementation, a rule is negotiated in advance between the smartphone and the large-screen device. For example, one field may be separately set in a replied message (the first message and the second message), and the field indicates that the large-screen device further has another capability. For example, the field length is 5 bits (bits). A location of the field is fixed in each message. The smartphone and the large-screen device know the location of the field and meaning represented by each bit in the field in advance.

In the 5-bit field, the first bit indicates whether the large-screen device has the BLE communication capability. If a value of a bit is 1, it represents that the large-screen device has the BLE communication capability. If a value of a bit is 0, it represents that the large-screen device does not have the BLE communication capability. Similarly, the second bit indicates whether the large-screen device has the USB communication capability. If a value of a bit is 1, it represents that the large-screen device has the USB communication capability. If a value of a bit is 0, it represents that the large-screen device does not have the USB communication capability. The third bit indicates whether the large-screen device has the NFC communication capability. If a value of a bit is 1, it represents that the large-screen device has the NFC communication capability. If a value of a bit is 0, it represents that the large-screen device does not have the NFC communication capability. The fourth bit indicates whether the large-screen device has the Wi-Fi communication capability. If a value of a bit is 1, it represents that the large-screen device has the Wi-Fi communication capability. If a value of a bit is 0, it represents that the large-screen device does not have the Wi-Fi communication capability. The fifth bit indicates whether the large-screen device has the cellular communication capability. If a value of a bit is 1, it represents that the large-screen device has the cellular communication capability. If a value of a bit is 0, it represents that the large-screen device does not have the cellular communication capability. The large-screen device and the smartphone negotiate an indication rule of the field in advance. In this way, the indication field is used, and the following may be implemented: indicating that the large-screen device further has another capability.

For another example, in another possible implementation, the large-screen device and the smartphone may negotiate one rule in advance: Different capabilities are respectively represented by using different special character strings (for example, one character string may be one specific sequence, and the sequence may include at least one of a digit, a letter, or a special character). In addition, these different special character strings may or may not exist in each replied message (the first message and the second message), for example, may be five different special character strings. The five different special character strings respectively represent a BT communication capability, a Wi-Fi communication capability, an NFC communication capability, a USB communication capability, and a cellular communication capability. If a special character string exists in a message, it represents that the large-screen device further has a communication capability corresponding to the special character string. If the special character string does not exist, it represents that the large-screen device does not have a communication capability corresponding to the special character string. The large-screen device and the smartphone negotiate an indication rule of the special character string in advance. In this way, these different special character strings may be used, the following may be implemented: indicating that the large-screen device further has another communication capability.

It should be understood that in embodiments of this application, for example, if the large-screen device supports the Bluetooth communication capability, but "Bluetooth" on the large-screen device is in a disabled state, in this case, the large-screen device cannot reply a message to the smartphone in a Bluetooth manner. However, a message broadcast or sent by the large-screen device by using another communication technology may carry the Bluetooth capability indication information, indicating that the large-screen device has the Bluetooth communication capability. Alternatively, a message broadcast or sent by using another communication technology may also not carry the Bluetooth capability indication information. In other words, a peer device (a smartphone) is not enabled to learn whether the large-screen device supports the Bluetooth communication capability.

Optionally, the first message and the second message may further respectively carry other capabilities or service information (for example, including a name of the large-screen device, a device type of the large-screen device, and the like) of the large-screen device. If the first message and the second message do not carry other capabilities or service information of the large-screen device, after the first message and the second message, the large-screen device and the smartphone need to perform additional broadcast packet interaction, so that the smartphone obtains other capabilities or service information of the large-screen device. Alternatively, the smartphone and the large-screen device exchange other capabilities or service information of the large-screen device in a process of connecting with each other.

In embodiments of this application, if the service query request broadcast by the smartphone is used to query a target capability and target service information (for example, one or more of BT, Wi-Fi, USB, NFC, and cellular, a file sharing service, a projection service, and the like) of a surrounding device, the large-screen device needs to match a capability and service information of the device. In other words, the large-screen device needs to determine, based on the target capability or the information about the target service carried in the service query request, whether the large-screen device meets the target capability and the target service. If the large-screen device meets the target capability and the target service, the large-screen device replies to the smartphone with a first message and a second message. The first message and the second message may further carry indication information, indicating that the large-screen device has the target capability or detailed information about the target service. For example, indication information exists in the first message and the second message respectively. The indication information indicates that the large-screen device has capabilities such as BT, Wi-Fi, USB, NFC, cellular, and the like, and supports services such as a file sharing service, a projection service, and the like. If the target capability or the target service is not met, the large-screen device does not reply to the smartphone with the first message and the second message. Alternatively, if the target capability or the target service is not met, the large-screen device also replies to the smartphone with the first message and the second message. The first message and the second message include indication information that indicates that the smartphone does not have the target capability or the target service.

In S306, after receiving the first message replied by the large-screen device in the BT manner and the second message replied by the large-screen device in the Wi-Fi manner, the smartphone also obtains the network identifier information of the large-screen device. Specifically, the smartphone may determine a BT MAC address of the large-screen device based on the first message, and determine a Wi-Fi MAC address of the large-screen device based on the second information. Optionally, the smartphone may further obtain an IP address of the large-screen device, and the smartphone determines, based on random values carried in the first message and the second message, that both the first message and the second message are from a same smartphone. The smartphone may obtain the network identifier information of the large-screen device based on the information. The network identifier information includes: BT MAC, Wi-Fi MAC, and IP. The network identifier information uniquely identifies the large-screen device. Optionally, if the smartphone does not obtain an IP address on the large screen, the network identifier information includes: BT MAC and Wi-Fi MAC. In other words, the network identifier information of the large-screen device includes two parameters of the large-screen device, where the two parameters are respectively a BT MAC address of the large-screen device and a Wi-Fi MAC address of the large-screen device. The network identifier information of the large-screen device uniquely identifies the large-screen device.

Optionally, in embodiments of this application, the first message and the second message may respectively carry the IP address of the large-screen device. In this case, the smartphone may obtain the IP address of the large-screen device.

Alternatively, if the first message and the second message do not carry the IP address of the large-screen device, after the large-screen device replies the first message and the second message, the smartphone may further send a broadcast packet to the large-screen device to query the IP address of the large-screen device, to obtain the IP address of the large-screen device.

In a process in which the smartphone discovers another device at the same time, because the smartphone repeatedly sends the foregoing six service query requests, the large-screen device also repeatedly replies to the smartphone with information. After the smartphone receives the reply information of the large-screen device next time, because the smartphone has obtained and saved the network identifier information of the smartphone, the smartphone receives one or more messages sent by the large-screen device in different manners (for example, one or more of BT, Wi-Fi, USB, NFC, and cellular) next time, if the one or more messages carry a same random value, the smartphone may determine, based on the same random value separately carried in the one or more received messages, that the same random value separately carried in the one or more messages is the same. Because the same random value carried in the one or more received messages is the same, the smartphone may determine that the one or more messages are from a same device (for example, referred to as a second device). Further, the smartphone compares, based on the information, an address separately carried in the one or more messages, for example, a plurality of the BT MAC address, the Wi-Fi MAC address, the USB MAC address, the NFC MAC address, and the IP address with previously stored network identifier information of the large-screen device (for example, in a manner of calculating a distance of data through a vector), and determines that the second device and the large-screen device are a same device, to be specific, perform deduplication processing on the device. Deduplication processing is performed on the device by using the network identifier information of the device. The network identifier information of the device may be changeable, and may be dynamically extended and updated based on a change of a capability supported by the device. Therefore, the network identifier information of the device may be dynamically extended. The network identifier information of the device identifies a device, which may effectively prevent ID information of the device from being traced and improve security of the device.

Alternatively, in another possible implementation, after the smartphone receives, next time, one or more messages sent by the large-screen device in different manners (for example, one or more of BT, Wi-Fi, USB, NFC, and cellular), if the one or more messages do not carry a random value, the smartphone may compare, based on the address information, an address separately carried in the one or more messages, for example, one or more of the BT MAC address, the Wi-Fi MAC address, the USB MAC address, the NFC MAC address, and the IP address with previously stored network identifier information of the large-screen device, and may also determine that the second device and the large-screen device are the same device, to be specific, perform deduplication processing on the device.

It should be understood that in embodiments of this application, in different device discovery processes of the smartphone, for example, the smartphone performs device discovery every five minutes, and a device discovered previous time and a device discovered next time also need to perform deduplication processing, and broadcast content of a same device is identified as a same device. A manner of deduplication processing is consistent with the foregoing process. For brevity, details are not described herein again.

It should be understood that in embodiments of this application, in S302, the smartphone broadcasts, in a broadcast manner, the service query request to a surrounding device in a plurality of manners. Therefore, in S306, in addition to receiving a message replied by the large-screen device, the smartphone may further receive a message replied by another device. After receiving the message replied by the other device, the smartphone may also obtain and store network identifier information corresponding to the another device, to uniquely identify one device. After receiving, by using the network identifier information, a plurality of messages replied by the device, the smartphone may perform deduplication processing on the device.

It should be further understood that in S306, after the smartphone receives the first message replied by the large-screen device in the BT manner and the second message replied by the large-screen device in the Wi-Fi manner, and obtains the network identifier information of the large-screen device, the large-screen device identifies that both the first message and the second message are from the large-screen device. Therefore, the smartphone may combine and share content of the first message and the second message (for example, device information, capability information, resolution, bit rate, decoding rate, and size of a transmitted data packet of the large-screen device). In this way, the smartphone discovers the large-screen device in the BT manner and performs capability negotiation with the large-screen device in the BT manner. When the smartphone has a Wi-Fi-based service, the smartphone further needs to discover the large-screen device in the Wi-Fi manner and perform capability negotiation with the large-screen device. This reduces signaling interaction, improves resource utilization, and improves user experience of a distributed service.

For example, in a same device discovery process, it is assumed that when the smartphone simultaneously receives information replied by the large-screen device in the BT manner and the Wi-Fi manner respectively, because the information sent in the BT manner and the information sent in the Wi-Fi manner carry different data amounts, the information sent in the Wi-Fi manner carries a large data amount, and the information sent in the BT manner carries a small data amount. After receiving the information sent by the large-screen device in the Wi-Fi manner, the smartphone may perform filtering and deduplication processing on the content included in the information sent in the Wi-Fi manner, so that interaction between the smartphone and the large-screen device in the BT manner for a plurality of times may be avoided. This reduces signaling overheads and improves resource utilization.

For another example, in different device discovery processes, if a device discovered by the smartphone next time and a device discovered by the smartphone previous time are matched through a grid identifier, and the matched devices are the same device, the device discovered by the smartphone next time may share the device capability or the service information discovered by the smartphone before. The smartphone only needs to synchronize some device capabilities or service information. In this way, the device capability and the service information need to be completely synchronized. This reduces signaling overheads and improves resource utilization.

In S306, the smartphone performs deduplication processing on device information discovered through a plurality of wireless and wired technologies, and displays identifiers of a plurality of different devices remaining after the deduplication processing to the user, to be specific, displays a device list to the user. For example, the display interface may be shown in d in FIG. 8D.

In S307, the user may select a large-screen device from a plurality of device lists as required, and then perform a connection to the large screen.

It should be understood that in S307, in addition to manually selecting, by the user from the plurality of device lists, the target device that needs to be connected, the smartphone may further automatically select the target device based on a preset condition. For example, the preset condition includes automatically connecting to another device whose distance from the smartphone is less than a threshold, automatically connecting to a device having a preset MAC address, and the like. This is not limited in embodiments of this application.

In S308, after the user selects the large-screen device, the smartphone sends a connection request to the large-screen device. In embodiments of this application, the connection request includes standard request information defined in a protocol corresponding to one or more optimal connection manners (such as Wi-Fi, Bluetooth, and the like), for example, may include information such as a connection address, a connection window, a security requirement, and the like.

It should be understood that in S308, the smartphone selects, based on the capability supported by the smartphone and the capability supported by a peer device (the large-screen device), and further, with reference to the service information that needs to be transmitted, one or more optimal manners from manners such as the BT, Wi-Fi, NFC, USB, Zigbee, and mobile network to be connected to the large-screen device.

Optionally, in a possible implementation, in S308, a connection strategy may be predefined. For example, when both the smartphone and the large-screen device support capabilities such as USB, Wi-Fi (5 GHz), Wi-Fi P2P (5 GHz), Wi-Fi (2.4 GHz), Wi-Fi P2P (2.4 GHz), BR/EDR, BLE, and the like. For a large-bandwidth service, different capabilities are sorted in descending order of priorities during near field transmission, where an order is USB>Wi-Fi (5 GHz)>Wi-Fi P2P (5 GHz)>Wi-Fi (2.4 GHz)>Wi-Fi P2P (2.4 GHz)>BR/EDR>BLE. During far field transmission, different capabilities (namely, technologies) are sorted in descending order of priorities. The order is Ethernet>Wi-Fi>cellular. When the smartphone is connected to the large-screen device, the smartphone may select, based on priorities of the foregoing different capabilities, a manner with a highest priority from capabilities supported by both the smartphone and the large-screen device to be connected to the large-screen device. Alternatively, the first several manners with high priorities are selected to be connected to the large-screen device.

In embodiments of this application, with a plurality of connections of service transmission between the smartphone and the large-screen device, the smartphone may monitor a communication delay in each connection process, information of a bandwidth in each connection process, and the like in a plurality of connection processes, dynamically adjust a manner of subsequently establishing a connection to the large-screen device, and dynamically adjust a priority order of different capabilities.

In S309, after receiving a connection request sent by the smartphone, the large-screen device determines, based on information carried in the connection request, a connection manner (for example, any one of BT, Wi-Fi, USB, NFC, and cellular) carried in the connection request, and establishes a communication connection between the large-screen device and the smartphone based on a connection manner.

Optionally, in S309, in a possible implementation, it is assumed that the smartphone supports a Bluetooth communication capability, and "Bluetooth" on the smartphone is in an enabled state. The large-screen device also supports the Bluetooth communication capability, but "Bluetooth" on the large-screen device is in a disabled state. In addition, the smartphone has clearly learned that the large-screen device supports the Bluetooth communication capability, or when the smartphone does not determine whether the large-screen device supports the Bluetooth communication capability, the user wants to establish a connection between the smartphone and the large-screen device in a Bluetooth manner. In this case, the connection request received by the large-screen device carries information such as a connection address, a connection window, and a security requirement that is required for the Bluetooth connection. The large-screen device first automatically enables "Bluetooth" based on the connection request, or the large-screen device prompts the user to enable "Bluetooth" of the large-screen device. After the "Bluetooth" is enabled, a Bluetooth connection may be established between the smartphone and the large-screen device. If the large-screen device does not support the Bluetooth communication capability, or the large-screen device supports the Bluetooth communication capability but is not allowed to enable "Bluetooth" temporarily, the large-screen device may prompt the user that the large-screen device does not support the Bluetooth connection temporarily. Optionally, the large-screen device does not respond to the connection request sent by the smartphone. Alternatively, the large-screen device may further reply to the smartphone with information, to notify the smartphone that the large-screen device does not support the Bluetooth connection temporarily. In this case, the smartphone cannot establish the Bluetooth connection to the large-screen device, but a connection based on another manner (for example, Wi-Fi) may be established between the smartphone and the large-screen device.

Optionally, in S309, in another possible implementation, if the large-screen device supports the Bluetooth communication capability, and "Bluetooth" on the large-screen device is already in an enabled state. The smartphone also supports the Bluetooth communication capability, but "Bluetooth" on the smartphone is in a disabled state. However, the user wants to establish a connection between the smartphone and the large-screen device in a Bluetooth manner. In this case, the smartphone prompts the user to enable "Bluetooth" of the smartphone. After the "Bluetooth" of the smartphone is enabled, the connection request sent by the smartphone to the large-screen device carries information such as a connection address, a connection window, and a security requirement that is required for the Bluetooth connection. In this case, a Bluetooth connection may be established between the smartphone and the large-screen device. If the "Bluetooth" on the smartphone is in a disabled state, and the "Bluetooth" on the smartphone cannot be enabled temporarily, the user wants to establish a connection between the smartphone and the large-screen device in a Bluetooth manner. In this case, the smartphone prompts the user that the smartphone does not support the Bluetooth connection temporarily. A connection request sent by the smartphone to the large-screen device does not carry information such as a connection address, a connection window, and a security requirement that is required for the Bluetooth connection. In this case, the smartphone cannot establish the Bluetooth connection to the large-screen device, but a connection based on another manner (for example, Wi-Fi) may be established between the smartphone and the large-screen device.

Optionally, in S309, in another possible implementation, it is assumed that the user transmits a video file to another device in a Wi-Fi manner by using the smartphone, the smartphone selects one or more communication technologies from communication technologies (for example, Bluetooth) except the Wi-Fi communication manner to establish a connection to the large-screen device with reference to use conditions of all communication technologies currently supported by the smartphone, and in the connection request sent by the smartphone to the large-screen device, information such as the connection address, the connection window, the security requirement, and the like that is required by the Wi-Fi connection is not carried. In this case, the smartphone cannot establish the Wi-Fi connection to the large-screen device, but a connection based on another manner (for example, Bluetooth) may be established between the smartphone and the large-screen device.

Optionally, in S309, in still another possible implementation, it is assumed that the user uses the large-screen device and is transmitting a file to another electronic device in a Wi-Fi manner, the large-screen device, with reference to use conditions of all communication technologies currently supported by the large-screen device, selects, based on a connection request sent by the smartphone, one or more communication technologies (such as Bluetooth, and the like) from communication technologies except the Wi-Fi communication manner to establish a communication connection to the large-screen device. Optionally, the large-screen device may further reply to the smartphone with information, to notify the smartphone that the large-screen device does not support a Wi-Fi connection temporarily. In this case, even if a connection request sent by the smartphone to the large-screen device carries information such as a connection address, a connection window, and a security requirement that is required for the Wi-Fi connection, the smartphone also cannot establish a Wi-Fi connection to the large-screen device, but a connection based on another manner (for example, Bluetooth) may be established between the smartphone and the large-screen device.

It should be understood that in embodiments of this application, connections of a plurality of different technologies may be simultaneously established between the smartphone and the large-screen device. For example, the BT connection and the Wi-Fi connection may simultaneously exist between the smartphone and the large-screen device.

In S310, after the communication connection is established between the large-screen device and the smartphone, the smartphone may transmit a data flow of a service to the large-screen device, and data communication starts between the large-screen device and the smartphone.

It should be understood that in embodiments of this application, when there are a plurality of connections between the smartphone and the large-screen device, the smartphone may select one of the optimal connections, or simultaneously select a plurality of connections to transmit data to the large-screen device.

According to the method for discovering and connecting to an electronic device provided in this application, technologies of all discover devices of a same electronic device or a plurality of technologies of all discover devices are used to simultaneously and actively broadcast or send packets, to meet a requirement of a business service on discover and connection capabilities of the device having a plurality of different technical capabilities in a heterogeneous network, and improve user experience. In addition, identifying one device by using a network identifier of a device may avoid a problem that an ID is prone to be traced when a unique device ID is usually used to identify the device in the current industry, effectively prevent ID information of the device from being traced, improve security of the device, and meet a requirement that when a device capability dynamically changes, the network identifier dynamically changes accordingly. Further, deduplication is performed on the device by using the network identifier of the device, to filter out repeated information, so that a plurality of discover and connection technologies may be used in parallel. This improves device discovery efficiency. In addition, during device connection, a capability supported by a peer device may be obtained, so that an optimal connection technology and a connection capability may be selected based on a service and a scenario to perform connection, to improve user experience.

Figure 10:
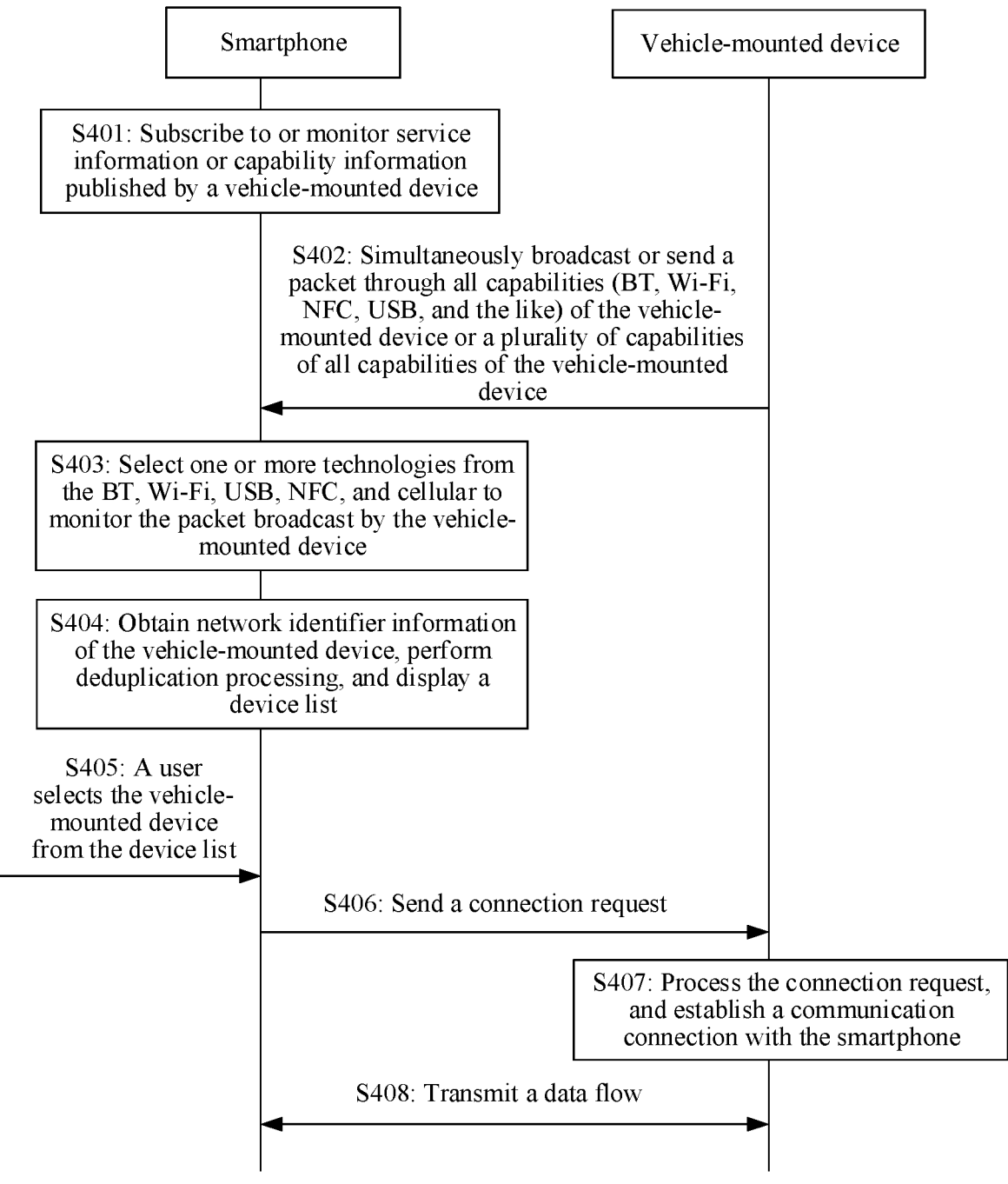
FIG. 10 is a schematic flowchart of another example of a method for discovering and connecting to an electronic device according to an embodiment of this application.

FIG. 10 is a schematic flowchart of an example of a method 400 for discovering and connecting to an electronic device in the scenario shown in FIG. 2 according to this application. In the scenario shown in FIG. 2, it is assumed that the smartphone 210 used by the user has capabilities such as BT, Wi-Fi, NFC, USB, cellular, and the like. The Wi-Fi may include two types of frequencies: 2.4 GHz and 5 GHz, which are respectively represented by Wi-Fi (2.4 GHz) and Wi-Fi (5 GHz). The vehicle-mounted device 220 supports a plurality of capabilities of BT, Wi-Fi, USB, and the like. The smartphone 210 may simultaneously monitor, through a plurality of capabilities such as BT, Wi-Fi, NFC, USB, cellular, and the like, a packet broadcast by a surrounding device. The vehicle-mounted infotainment has capabilities such as BT, Wi-Fi, and USB, and the vehicle-mounted device 220 may enable the smartphone 210 to discover existence of the vehicle-mounted device 220 through broadcast capabilities of BT, Wi-Fi, and USB, to complete connection and data communication between the smartphone 210 and the vehicle-mounted device 220. The smartphone 210 discovers the vehicle-mounted device 220 in a passive discover manner. It is assumed that the smartphone 210 has been connected to the vehicle-mounted device 220 by using the USB. The smartphone may be understood as the discover device, and the large-screen device may be understood as the discoverable device or a scanning device. As shown in FIG. 10, the method 400 includes: S401 to S408.

S401: A smartphone subscribes to or monitors service information or capability information published by a vehicle-mounted device.

S402: The vehicle-mounted device actively sends and broadcasts the vehicle-mounted device or service information of the vehicle-mounted device. Specifically, the vehicle-mounted device may simultaneously broadcast or send a packet by using all capabilities (BT, Wi-Fi, NFC, USB, and the like) of the vehicle-mounted device or a plurality of capabilities of all capabilities of the vehicle-mounted device. Packets broadcast or sent in different manners carry capability information of the vehicle-mounted device, and further, may carry service information (for example, a name of the vehicle-mounted device, a device type of the vehicle-mounted device, and services such as file sharing and projection supported by the vehicle-mounted device) of the vehicle-mounted device.

It is assumed that the vehicle-mounted device simultaneously broadcasts or sends a packet by using BT, Wi-Fi, NFC, and USB.

The first packet broadcast in the BT manner carries: Wi-Fi capability indication information, NFC capability indication information, and USB capability indication information. The Wi-Fi capability indication information indicates that the vehicle-mounted device further broadcasts the packet in a Wi-Fi manner, the NFC capability indication information indicates that the vehicle-mounted device further broadcasts the packet in an NFC manner, and the USB capability indication information indicates that the vehicle-mounted device further sends the packet in a USB manner.

Optionally, the first packet further includes BT capability indication information. The BT capability indication information indicates that the vehicle-mounted device further broadcasts the packet in a BT manner.

Similarly, packets separately sent or broadcast in the Wi-Fi manner, the NFC manner, and the USB manner respectively carry information that indicates that the vehicle-mounted device further broadcasts or sends a packet in another manner.

In other words, packets broadcast in different manners respectively carry indication information that indicates that the vehicle-mounted device simultaneously broadcasts or sends a packet by using all other capabilities of the vehicle-mounted device.

Optionally, in embodiments of this application, in another possible implementation, the BT capability indication information may further indicate that the vehicle-mounted device further has the BT communication capability, the Wi-Fi capability indication information may further indicate that the vehicle-mounted device further has the Wi-Fi communication capability, and the NFC capability indication information may further indicate that the vehicle-mounted device further has the NFC communication capability. The USB capability indication information may further indicate that the vehicle-mounted device further has the USB communication capability. In other words, the various pieces of capability indication information may further indicate that the vehicle-mounted device has a communication capability, which does not mean that the vehicle-mounted device sends or broadcasts a packet by using the communication capability.

Optionally, in embodiments of this application, in addition to the manner in which other capability indication information is separately carried in the foregoing four packets, the vehicle-mounted device may be notified that the smartphone further broadcasts or sends the service query request to the vehicle-mounted device by using the another capability, or another optional manner may be used. A specific solution thereof is similar to a specific solution in the method 300. For corresponding descriptions, refer to related descriptions in S302 in the method 300. For brevity, details are not described herein again.

In embodiments of this application, each of the foregoing four packets further carries one random value (which may also be referred to as a random code). Random values respectively carried in the six service query requests are the same. The random values are generated by the vehicle-mounted device, and uniquely identify the vehicle-mounted device. In other words, the random value uniquely identifies one device.

It should be understood that in embodiments of this application, when the vehicle-mounted device simultaneously broadcasts a packet through all capabilities (BT, Wi-Fi, NFC, USB, Zigbee, cellular, and the like) of the vehicle-mounted device, because different capabilities or technologies have various corresponding protocol specifications, a conflict problem of a channel, an air interface time sequence, and the like may exist when the packet is broadcast by using a plurality of different technologies. In other words, interference may exist between packets broadcast by using different technologies. Therefore, when the vehicle-mounted device broadcasts a packet by using manners such as BT, Wi-Fi, NFC, USB, Zigbee, cellular, or the like, a conflict avoidance mechanism described in the method 300 may be used. A specific solution thereof is similar to a specific solution in the method 300. For corresponding descriptions, refer to related descriptions in S302 in the method 300. For brevity, details are not described herein again.

It should be understood that in embodiments of this application, the foregoing four packets may be sent for a plurality of times. For example, the foregoing four packets are sent at a first moment. At a moment after the first moment, the vehicle-mounted device may repeatedly send the foregoing four packets or any plurality of the foregoing four packets. Optionally, the vehicle-mounted device may periodically send the foregoing four packets.

In S403, the smartphone selects, based on a condition of the smartphone, one or more technologies from BT, Wi-Fi, USB, NFC, and cellular to monitor a packet broadcast by a surrounding device. For example, the smartphone may select, based on a capability supported by the smartphone, a delay requirement, power consumption, and the like, one or more capabilities (in BT, Wi-Fi, USB, NFC, and cellular) from capabilities supported by the smartphone to perform monitoring. For a specific process of S403, refer to the description in S303 in the method 300. A difference lies in that in S303, the large-screen device performs monitoring, and in S403, the smartphone performs monitoring. In addition, other specific processes are the same, and details are not described herein again.

In S404, after the smartphone monitors all or a part of packets of the four packets broadcast by the vehicle-mounted device, it is assumed that the smartphone monitors the first packet, the second packet, the third packet, and the fourth packet. The smartphone determines, based on the first packet, a MAC address corresponding to a BT capability of the vehicle-mounted device, which is referred to as a BT MAC address for short below. The smartphone determines, based on the second packet, a MAC address corresponding to a Wi-Fi capability of the vehicle-mounted device, which is referred to as a Wi-Fi MAC address for short below. The smartphone determines, based on the third packet, a MAC address corresponding to an NFC capability of the smartphone, which is referred to as an NFC MAC address for short below. The smartphone determines, based on the fourth packet, a MAC address corresponding to a USB capability of the vehicle-mounted device, which is referred to as a USB MAC address for short below. In addition, the smartphone determines, based on random values respectively carried in the first packet, the second packet, the third packet, and the fourth packet, that the first packet, the second packet, the third packet, and the fourth packet are all from a same device. The smartphone may obtain the network identifier information of the vehicle-mounted device based on the information. The network identifier information includes: BT MAC, Wi-Fi MAC, USB MAC and NFC MAC. In other words, the network identifier information includes four parameters of the vehicle-mounted device, where the four parameters are respectively: a BT MAC address of the vehicle-mounted device, a Wi-Fi MAC address of the vehicle-mounted device, a USB MAC address of the vehicle-mounted device, and an NFC MAC address of the vehicle-mounted device. The network identifier information uniquely identifies the vehicle-mounted device.

Optionally, in embodiments of this application, in another possible implementation, the first packet to the fourth packet each may further carry an IP address of the vehicle-mounted device. In this case, the smartphone may also obtain the IP address of the vehicle-mounted device, to obtain the network identifier information of the vehicle-mounted device. The network identifier information includes: the BT MAC, Wi-Fi MAC, USB MAC, NFC MAC and IP address. In other words, the network identifier information includes five parameters of the vehicle-mounted device. The five parameters are respectively: a BT MAC address of the vehicle-mounted device, a Wi-Fi MAC address of the vehicle-mounted device, a USB MAC address of the vehicle-mounted device, an NFC MAC address of the vehicle-mounted device, and an IP address of the vehicle-mounted device.

Alternatively, if the first packet to the fourth packet do not carry the IP address of the vehicle-mounted device, after the smartphone receives the first packet to the fourth packet, the smartphone may further send the broadcast packet to the vehicle-mounted device to query the IP address of the vehicle-mounted device, to obtain the IP address of the vehicle-mounted device.

Further, the smartphone may perform deduplication processing on the device and information sharing between different technologies by using the network identifier information of the vehicle-mounted device. For a specific process, refer to the description in S304 in the method 300. A difference lies in that in S304, deduplication processing is performed on the large-screen device, and in S404, deduplication processing is performed on the smartphone. In addition, other specific processes are the same, and details are not described herein again.

In S404, the smartphone performs deduplication processing on device information discovered through a plurality of wireless and wired technologies, and displays identifiers of a plurality of different devices remaining after the deduplication processing to the user, to be specific, displays a device list to the user. For example, the display interface may be shown in d in FIG. 8D.

In S405, the user may select a vehicle-mounted device from a plurality of device lists as required, and then perform a connection to the vehicle-mounted device.

It should be understood that in S405, in addition to manually selecting, by the user from the plurality of device lists, the target device that needs to be connected, the smartphone may further automatically select the target device based on a preset condition. For example, the preset condition includes automatically connecting to another device whose distance from the smartphone is less than a threshold, automatically connecting to a device having a preset MAC address, and the like. This is not limited in embodiments of this application.

In S406, after the user selects the vehicle-mounted device, the smartphone sends a connection request to the vehicle-mounted device. The connection request includes standard request information defined in a protocol corresponding to one or more optimal connection manners (such as Wi-Fi, Bluetooth, and the like), for example, may include information such as a connection address, a connection window, and a security requirement.

It should be understood that in S406, the smartphone selects, based on the capability supported by the smartphone and the capability supported by a peer device (the vehicle-mounted device), and further, with reference to the service information that needs to be transmitted, one or more optimal manners from manners such as the BT, Wi-Fi, NFC, USB, Zigbee, and mobile network to be connected to the large-screen device. For a specific process, refer to the description in S308 in the method 300. Details are not described herein again.

In S407, after receiving a connection request sent by the smartphone, the vehicle-mounted device determines, based on information carried in the connection request, a connection manner (for example, any one or more of BT, Wi-Fi, USB, and NFC) carried in the connection request, and establishes a communication connection between the vehicle-mounted device and the smartphone based on a connection manner.

It should be understood that in embodiments of this application, connections of a plurality of different technologies may be established between the smartphone and the vehicle-mounted device. For example, both a BT connection and a Wi-Fi connection may be established between the smartphone and the vehicle-mounted device.

In S408, after the communication connection is established between the vehicle-mounted device and the smartphone, the user may send data to the vehicle-mounted device through the smartphone.

It should be understood that in embodiments of this application, when there are a plurality of connections between the smartphone and the vehicle-mounted device, the smartphone may select one of the optimal connections, or simultaneously select a plurality of connections to transmit data to the vehicle-mounted device.

According to the method for discovering and connecting to an electronic device provided in this application, a packet broadcast by a surrounding device is actively monitored by using technologies of all discover devices of the electronic device or a plurality of technologies of all discover devices. In addition, the surrounding device simultaneously and actively broadcasts a packet by using technologies of all discover devices of the surrounding device or a plurality of technologies of all discover devices of the surrounding device, to meet a requirement of a business service on discovery and connection capabilities of the device having a plurality of different technical capabilities in a heterogeneous network, and improve user experience. In addition, identifying one device by using a network identifier of a device may avoid a problem that an ID is prone to be traced when a unique device ID is usually used to identify the device in the current industry, effectively prevent ID information of the device from being traced, improve security of the device, and meet a requirement that when a device capability dynamically changes, the network identifier dynamically changes accordingly. Further, deduplication is performed on the device by using the network identifier of the device, to filter out repeated information, so that a plurality of discover and connection technologies may be used in parallel. This improves device discovery efficiency. In addition, during device connection, a capability supported by a peer device may be obtained, so that an optimal connection technology and a connection capability may be selected based on a service and a scenario to perform connection, to improve user experience.

It should be further understood that the foregoing descriptions are merely intended to help a person skilled in the art better understand embodiments of this application, but are not intended to limit the scope of embodiments of this application. It is clear that a person skilled in the art may make various equivalent modifications or changes based on the foregoing examples. For example, some steps in the method 300 to the method 400 may be unnecessary, some steps may be newly added. Alternatively, any two or more of the foregoing embodiments are combined. A modified, changed, or combined solution also falls within the scope of embodiments of this application.

It should be further understood that division into the manners, cases, categories, and embodiments in embodiments of this application is merely intended for ease of description, and should not constitute a particular limitation.

The features in the manners, categories, cases, and embodiments may be combined without contradiction.

It should be further understood that numerals used in embodiments of this application are differentiated merely for ease of description, but are not used to limit the scope of embodiments of this application. The sequence numbers of the foregoing processes do not mean execution sequences. The execution sequences of the processes should be determined according to functions and internal logic of the processes, and should not be construed as any limitation on the implementation processes of embodiments of this application.

It should be further understood that the foregoing descriptions of embodiments of this application emphasize differences between embodiments. For same or similar parts that are not mentioned, refer to embodiments. For brevity, details are not described herein again.

With reference to FIG. 1 to FIG. 10, the foregoing describes the embodiments of the method for discovering and connecting to an electronic device according to embodiments of this application. The following describes an electronic device provided in embodiments of this application.

In this embodiment, division of a functional module may be performed on an electronic device (including the foregoing first electronic device and second electronic device) according to the foregoing method. For example, each functional module may be obtained through division based on a corresponding function, or two or more functions may be integrated into one processing module. The integrated module may be implemented in a form of hardware. It should be noted that, in this embodiment, division into the modules is an example, is merely logical function division, and may be other division during actual implementation.

It should be noted that related content of all steps in the foregoing method embodiments may be cited in function description of corresponding functional modules. Details are not described herein again.

The electronic device provided in embodiments of this application is configured to perform any method for discovering and connecting to an electronic device provided in the foregoing method embodiments, and therefore may achieve a same effect as the foregoing implementation method. When an integrated unit is used, the electronic device may include a processing module, a storage module, and a communication module. The processing module may be configured to control and manage an action of the electronic device. For example, the processing module may be configured to support the electronic device in performing the steps performed by the processing unit. The storage module may be configured to support in storing program code, data, and the like. The communication module may be configured to support the electronic device in communicating with another device.

The processing module may be a processor or a controller. The processor may implement or execute various example logical blocks, modules, and circuits described with reference to content disclosed in this application. The processor may alternatively be a combination for implementing a computing function, for example, a combination including one or more microprocessors or a combination of a digital signal processor (DSP) and a microprocessor. The storage module may be a memory. The communication module may be specifically a device, for example, a radio frequency circuit, a Bluetooth chip, a Wi-Fi chip, or the like that interacts with another electronic device.

Figure 11:
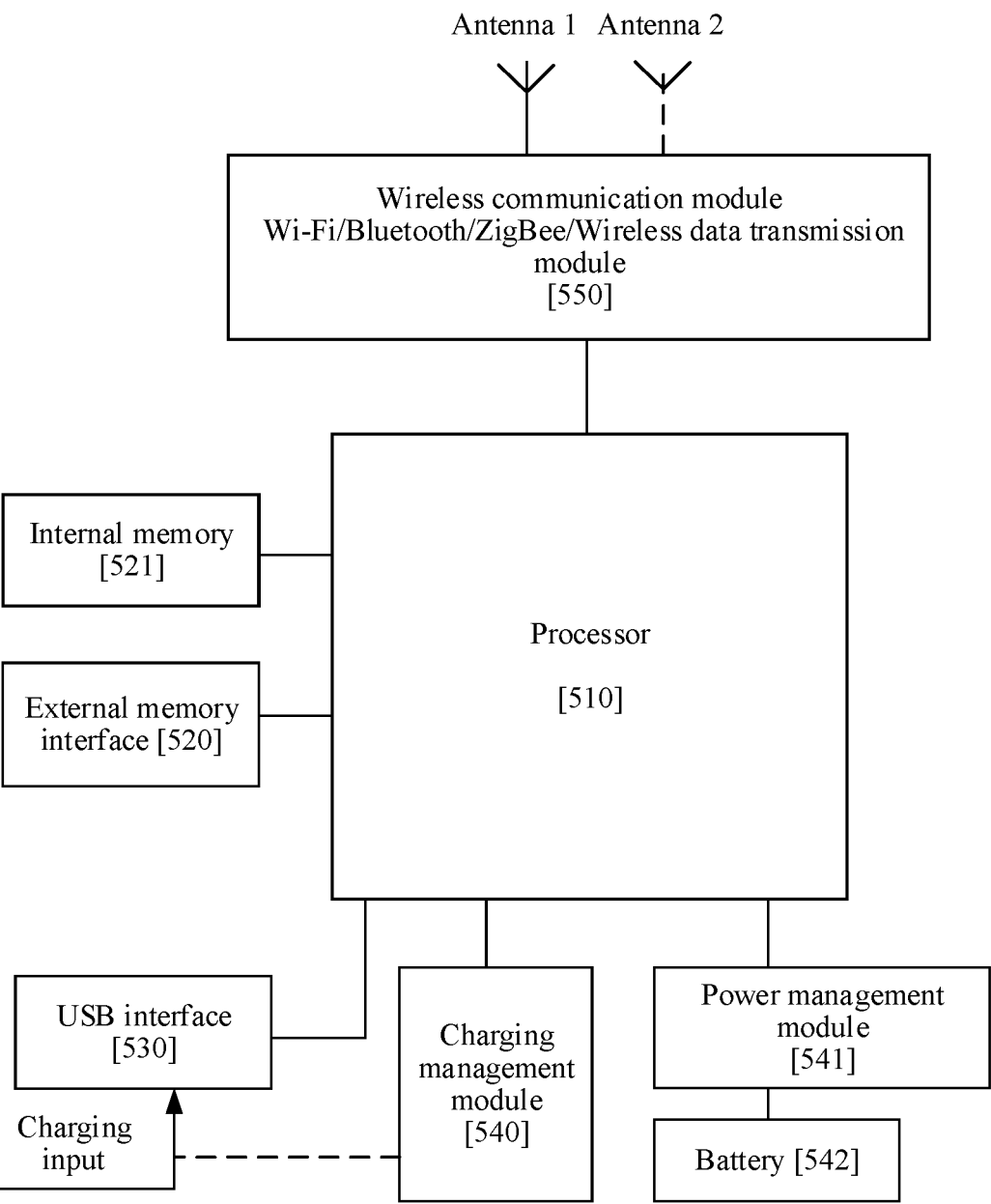
FIG. 11 is a schematic block diagram of a structure of an electronic device according to an embodiment of this application.

For example, FIG. 11 is a schematic diagram of a hardware structure of an electronic device 500 according to this application. The electronic device 500 may be s smartphone, a large-screen device, or a vehicle-mounted device in the foregoing method embodiments. As shown in FIG. 11, the electronic device 500 may include a processor 510, an external memory interface 520, an internal memory 521, a USB interface 530, a charging management module 540, a power management module 541, a battery 542, an antenna 1, an antenna 2, a wireless communication module 550, and the like.

It may be understood that the structure shown in embodiments of this application does not constitute a specific limitation on the electronic device 500. In some other embodiments of this application, the electronic device 500 may include more or fewer components than those shown in the figure, or some components may be combined, or some components may be split, or components are arranged in different manners. The components shown in the figure may be implemented by hardware, software, or a combination of software and hardware.

The processor 510 may include one or more processing units. For example, the processor 510 may include an application processor (AP), a modem processor, a graphics processing unit (GPU), an image signal processor (ISP), a controller, a video codec, a DSP, a baseband processor, and/or a neural-network processing unit (NPU). Different processing units may be independent components, or may be integrated into one or more processors. In some embodiments, the electronic device 500 may also include one or more processors 510. The controller may generate an operation control signal based on instruction operation code and a time sequence signal, to complete control of instruction reading and instruction execution.

In some embodiments, the processor 510 may include one or more interfaces. The interface may include an inter-integrated circuit (I2C) interface, an integrated circuit sound (I2S) interface, a pulse-code modulation (PCM) interface, a universal asynchronous receiver/transmitter (UART) interface, a mobile industry processor interface (MIPI), a general-purpose input/output (GPIO) interface, a SIM card interface, a USB interface, and/or the like. The USB interface 530 is an interface that conforms to a USB standard specification, and may be specifically a mini USB interface, a micro USB interface, a USB type-C interface, or the like. The USB interface 530 may be configured to connect to a charger to charge the electronic device 500, may be configured to transmit data between the electronic device 500 and a surrounding device.

It may be understood that an interface connection relationship between the modules illustrated in embodiments of this application is merely an example for description, and constitutes no limitation on the structure of the electronic device 500. In some other embodiments of this application, the electronic device 500 may alternatively use an interface connection manner different from an interface connection manner in this embodiment, or use a combination of a plurality of interface connection manners.

A wireless communication function of the electronic device 500 may be implemented through an antenna 1, an antenna 2, a wireless communication module 550, and the like.

The wireless communication module 550 may provide a wireless communication solution that is applied to the electronic device 500 and that includes Wi-Fi (including Wi-Fi awareness and a Wi-Fi AP), Bluetooth (Bluetooth, BT), NFC, USB, ZigBee, a mobile network, and a wireless data transmission module (for example, 433 MHz, 868 MHz, or 515 MHz). The wireless communication module

550 may be one or more devices integrating at least one communication processing module. The wireless communication module 550 receives an electromagnetic wave by using the antenna 1 or the antenna 2 (or the antenna 1 and the antenna 2), performs filtering and frequency modulation processing on an electromagnetic wave signal, and sends a processed signal to the processor 510. The wireless communication module 550 may further receive a to-be-sent signal from the processor 510, perform frequency modulation and amplification on the signal, and convert the signal into an electromagnetic wave for radiation through the antenna 1 or the antenna 2.

The external memory interface 520 may be configured to connect to an external storage card such as a micro SD card, to expand a storage capability of the electronic device 500. The external memory card communicates with the processor 510 through the external memory interface 520, to implement a data storage function. For example, files such as music and videos are stored in the external storage card.

The internal memory 521 may be configured to store one or more computer programs, and the one or more computer programs include instructions. The processor 510 may run the foregoing instructions stored in the internal memory 521, so that the electronic device 500 performs the method for discovering and connecting to an electronic device provided in some embodiments of this application, various applications, data processing, and the like. The internal memory 521 may include a code storage area and a data storage area. The code storage area may store an operating system. The data storage area may store data created during use of the electronic device 500, and the like. In addition, the internal memory 521 may include a high-speed random-access memory (RAM), or may further include a non-volatile memory such as one or more magnetic disk components, flash memory components, or universal flash storages (UFS). In some embodiments, the processor 510 may run the instructions stored in the internal memory 521 and/or the instructions stored in the memory disposed in the processor 510, to enable the electronic device 500 to perform any method for discovering and connecting to an electronic device provided in embodiments of this application, and other applications and data processing.

The electronic device 500 includes but is not limited to a smart television, a large-screen device, a mobile phone, a tablet computer, a notebook computer, a large-screen television, a smart home product, a PDA, a POS, a vehicle-mounted computer, and the like. This is not limited in embodiments of this application.

It should be understood that for a specific process of performing the foregoing corresponding steps by the electronic device 500, refer to related descriptions of the steps performed by the smartphone, the large-screen device, or the vehicle-mounted device described with reference to the embodiments shown in FIG. 6 and FIG. 10. For brevity, details are not described herein again.

It should be further understood that division of units in the apparatus is merely logical function division. During actual implementation, all or some of the units may be integrated into one physical entity or may be physically separated. In addition, all units in the apparatus may be implemented in a form of software invoking by a processing element; may also be implemented in the form of hardware; and alternatively, some units may be implemented in a form of invoking by software through a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element. In an example, a unit in any one of the foregoing apparatuses may be one or more integrated circuits configured to implement the foregoing method, for example, one or more application-specific integrated circuits (ASICs), one or more digital signal processors (DSPs), one or more field-programmable gate arrays (FPGAs), or a combination of at least two of these integrated circuit forms. For another example, when the units in the apparatus may be implemented in a form of scheduling a program by the processing element, the processing element may be a general-purpose processor, for example, a central processing unit (CPU) or another processor that can invoke the program. For still another example, the units may be integrated and implemented in a form of a system-on-a-chip (SOC).

Embodiments of this application further provide a system for a method for discovering and connecting to an electronic device. The system includes a first electronic device (for example, a smartphone) and a second electronic device (for example, a large-screen device or a vehicle-mounted device) provided in the foregoing method embodiments.

Embodiments of this application further provide a computer-readable storage medium, configured to store computer program code. The computer program includes instructions used to perform any method for discovering and connecting to an electronic device provided in embodiments of this application. The readable medium may be a read-only memory (ROM) or a RAM. This is not limited in embodiments of this application.

This application further provides a computer program product. The computer program product includes instructions; and when the instructions are executed, the first electronic device and the second electronic device perform corresponding operations corresponding to the method 300 and the method 400.

Embodiments of this application further provide a chip located in a communication apparatus. The chip includes a processing unit and a communication unit. The processing unit may be, for example, a processor, and the communication unit may be, for example, an input/output interface, a pin, or a circuit. The processing unit may execute computer instructions, to enable the communication apparatus to perform any method for discovering and connecting to an electronic device provided in embodiments of this application.

Optionally, the computer instruction is stored in a storage unit.

Optionally, the storage unit is a storage unit inside the chip, such as a register or a cache. Alternatively, the storage unit may be a storage unit that is inside the terminal and that is located outside the chip, such as a ROM, another type of static storage device that can store static information and an instruction, or a random RAM. Any processor mentioned above may be a CPU, a microprocessor, an ASIC, or one or more integrated circuits used to control program execution of the feedback information transmission method. The processing unit and the storage unit may be decoupled, are separately disposed on different physical devices, and are connected in a wired or wireless manner to implement functions of the processing unit and the storage unit, to support the system chip in implementing various functions in the foregoing embodiments. Alternatively, the processing unit and the memory may be coupled to a same device.

The communication apparatus, the computer-readable storage medium, the computer program product, or the chip provided in embodiments is configured to perform a corresponding method provided above. Therefore, for beneficial effects that can be achieved by the communication apparatus, the computer storage medium, the computer program product, or the chip, refer to beneficial effects of the corresponding method provided above. Details are not described herein again.

It can be understood that the memory in embodiments of this application may be a volatile memory or a non-volatile memory, or may include both a volatile memory and a non-volatile memory. The non-volatile memory may be a ROM, a programmable read-only memory (PROM), an EPROM, an electrically erasable programmable read-only memory (EEPROM), or a flash memory. The volatile memory may be a RAM, and serves as an external cache. There are a plurality of different types of RAMs, such as a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM).

In this application, names may be assigned to various objects such as messages/information/devices/network elements/systems/apparatuses/actions/operations/procedures/concepts. It can be understood that the specific names do not constitute a limitation on the related objects. The assigned names may vary with factors such as scenarios, contexts, or usage habits. Understanding of technical meanings of technical terms in this application should be determined mainly based on functions and technical effects embodied/performed by the technical terms in the technical solutions.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

All or some of the methods in embodiments of this application may be implemented by software, hardware, firmware, or any combination thereof. When software is used to implement the embodiments, all or a part of the embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, or any other programmable apparatus. The computer programs or the instructions may be stored in the computer-readable storage medium, or may be transmitted through the computer-readable storage medium. The computer-readable storage medium may be any usable medium accessible by a computer, or a data storage device such as a server integrating one or more usable media.

It may be clearly understood by a person skilled in the art that, for the purpose of convenient and brief description, for a specific working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a readable storage medium, and includes several instructions for instructing a computer device (which may be a personal computer, a server, or a network device) to perform all or some of the steps of the methods described in embodiments of this application. The foregoing readable storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method applied to a first electronic device and comprising:

broadcasting a first packet in a first time period using a first communication technology, wherein the first packet queries a first communication technology capability of one or more secondary devices;

broadcasting a second packet in a second time period using a second communication technology, wherein the second packet queries a second communication technology capability of the one or more secondary devices, wherein both the first packet and the second packet comprise a first random code of the first electronic device, and wherein the first time period overlaps with the second time period;

receiving, based on the first packet and the second packet, response information from a second electronic device of the one or more secondary devices;

determining, based on the response information, a communication technology capability supported by the second electronic device;

establishing a communication connection to the second electronic device based on the communication technology capability supported by the second electronic device; and broadcasting a third packet in a third time period using a third communication technology, wherein the third packet queries a third communication technology capability of the one or more secondary devices, wherein the third communication technology conflicts with the first communication technology, wherein the first time period does not overlap with the third time period, and wherein the second time period overlaps with the third time period.

2. The method of claim 1, wherein the first packet comprises indication information that indicates a communication technology capability of the first electronic device or indicates a communication technology used by the first electronic device to broadcast the first packet or the second packet.

3. The method of claim 1, wherein the response information comprises:

a second random code of the second electronic device; and indication information that indicates a communication technology capability of the second electronic device.

4. The method of claim 3, wherein before establishing the communication connection to the second electronic device based on the communication technology capability supported by the second electronic device, the method further comprises:

determining, based on the second random code, that the response information is from the second electronic device; and obtaining network identifier information of the second electronic device based on the response information, wherein the network identifier information of the second electronic device comprises a media access control (MAC) address or an Internet Protocol (IP) address of the second electronic device.

5. The method of claim 4, wherein after receiving the response information from the second electronic device, the method further comprises:

receiving first information from the second electronic device, wherein the first information comprises a network identifier of the second electronic device; and determining, based on the network identifier information of the second electronic device and the network identifier of the second electronic device that is carried in the first information, that the first information is from the second electronic device.

6. The method of claim 1, wherein establishing the communication connection to the second electronic device based on the communication technology capability supported by the second electronic device comprises:

determining, based on the communication technology capability supported by the second electronic device, a communication technology capability set supported by both the first electronic device and the second electronic device;

sending, based on the communication technology capability set, a connection request to the second electronic device based on a to-be-transmitted service, wherein the connection request comprises connection information corresponding to one or more communication technologies respectively; and establishing the communication connection to the second electronic device using the one or more communication technologies.

7. The method of claim 1, wherein the first communication technology or the second communication technology is Bluetooth, Wi-Fi, near-field communication (NFC), Universal Serial Bus (USB), ZigBee, or a cellular network, and wherein the first communication technology is different from the second communication technology.

8. A method applied to a second electronic device and comprising:

receiving, in a first time period, a first packet broadcast by a first electronic device using a first communication technology, wherein the first packet queries a first communication technology capability of one or more secondary devices;

receiving, in a second time period, a second packet broadcast by the first electronic device using a second communication technology, wherein the second packet queries a second communication technology capability of the one or more secondary devices, wherein both the first packet and the second packet comprise a first random code of the first electronic device, and wherein the first time period overlaps with the second time period;

sending response information to the first electronic device based on the first packet and the second packet;

receiving a connection request from the first electronic device;

establishing a communication connection to the first electronic device based on the connection request; and receiving, in a third time period, a third packet broadcast by the first electronic device using a third communication technology, wherein the third packet queries a third communication technology capability of the one or more secondary devices, wherein the third communication technology conflicts with the first communication technology, wherein the first time period does not overlap with the third time period, and wherein the second time period overlaps with the third time period.

9. The method of claim 8, wherein the first packet comprises indication information that indicates a communication technology capability of the first electronic device or indicates a communication technology used by the first electronic device to broadcast the first packet or the second packet.

10. The method of claim 8, wherein before establishing the communication connection to the first electronic device based on the connection request, the method further comprises:

determining, based on the first random code, that both the first packet and the second packet are from the first electronic device; and obtaining network identifier information of the first electronic device based on the first packet and the second packet, wherein the network identifier information of the first electronic device comprises a media access control (MAC) address or an Internet Protocol (IP) address of the first electronic device.

11. The method of claim 10, wherein after receiving the first packet and the second packet, the method further comprises:

receiving second information from the first electronic device, wherein the second information comprises a network identifier of the first electronic device; and determining, based on the network identifier information of the first electronic device and the network identifier of the first electronic device that is carried in the second information, that the second information is from the first electronic device.

12. The method of claim 8, wherein the response information comprises:

a second random code of the second electronic device; and indication information that indicates a communication technology capability of the second electronic device.

13. The method of claim 8, wherein the first communication technology or the second communication technology is Bluetooth, Wi-Fi, near-field communication (NFC), Universal Serial Bus (USB), ZigBee, or a cellular network, and wherein the first communication technology is different from the second communication technology.

14. A first electronic device, comprising:

a memory configured to store program instructions; and one or more processors coupled to the memory and configured to execute the program instructions to cause the first electronic device to:

broadcast a first packet in a first time period using a first communication technology, wherein the first packet queries a first communication technology capability of one or more secondary devices;

broadcast a second packet in a second time period using a second communication technology, wherein the second packet queries a second communication technology capability of the one or more secondary devices, both the first packet and the second packet comprise a first random code of the first electronic device, and the first time period overlaps with the second time period;

receive response information from a second electronic device;

determine, based on the response information, a communication technology capability supported by the second electronic device;

establish a communication connection to the second electronic device based on the communication technology capability supported by the second electronic device; and broadcast a third packet in a third time period using a third communication technology, wherein the third packet queries a third communication technology capability of another device, wherein the third communication technology conflicts with the first communication technology, wherein the first time period does not overlap with the third time period, and wherein the second time period overlaps with the third time period.

15. The first electronic device of claim 14, wherein the first packet comprises indication information that indicates a communication technology capability of the first electronic device or indicates a communication technology used by the first electronic device to broadcast the first packet or the second packet.

16. The first electronic device of claim 14, wherein the response information comprises:

a second random code of the second electronic device; and indication information that indicates a communication technology capability of the second electronic device.

17. The first electronic device of claim 16, wherein the one or more processors are further configured to execute the program instructions to cause the first electronic device to:

determine, based on the second random code, that the response information is from the second electronic device; and obtain network identifier information of the second electronic device based on the response information, wherein the network identifier information of the second electronic device comprises a media access control (MAC) address or an Internet Protocol (IP) address of the second electronic device.

18. The first electronic device of claim 17, wherein after receiving the response information from the second electronic device, the one or more processors are further configured to execute the program instructions to cause the first electronic device to:

receive first information from the second electronic device, wherein the first information comprises a network identifier of the second electronic device; and determine, based on the network identifier information of the second electronic device and the network identifier of the second electronic device that is carried in the first information, that the first information is from the second electronic device.

19. The first electronic device of claim 14, wherein the one or more processors are further configured to execute the program instructions to cause the first electronic device to establish the communication connection to the second electronic device based on the communication technology capability supported by the second electronic device by:

determining, based on the communication technology capability supported by the second electronic device, a communication technology capability set supported by both the first electronic device and the second electronic device;

sending, based on the communication technology capability set, a connection request to the second electronic device based on a to-be-transmitted service, wherein the connection request comprises connection information corresponding to one or more communication technologies respectively; and establishing the communication connection to the second electronic device using the one or more communication technologies.

20. The first electronic device of claim 14, wherein the first communication technology or the second communication technology is Bluetooth, Wi-Fi, near-field communication (NFC), Universal Serial Bus (USB), ZigBee, or a cellular network, and wherein the first communication technology is different from the second communication technology.

* * * * *